(12) United States Patent
Herrles et al.

(10) Patent No.: US 11,946,264 B2
(45) Date of Patent: Apr. 2, 2024

(54) PRESSURE PLATE ARRANGEMENT, PRODUCTION ARRANGEMENT, DEVICE AND METHOD FOR PRODUCING A TRANSITION REGION BETWEEN AERODYNAMIC PROFILE ELEMENTS

(71) Applicant: Airbus Defence and Space GmbH, Taufkirchen (DE)

(72) Inventors: Christian Herrles, Taufkirchen (DE); Thomas Bürger, Taufkirchen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 523 days.

(21) Appl. No.: 16/878,027

(22) Filed: May 19, 2020

(65) Prior Publication Data

US 2020/0386001 A1 Dec. 10, 2020

(30) Foreign Application Priority Data

May 21, 2019 (DE) ..................... 10 2019 113 566.4

(51) Int. Cl.
*E04F 19/06* (2006.01)
*B29C 43/18* (2006.01)
(Continued)

(52) U.S. Cl.
CPC ............ *E04F 19/062* (2013.01); *B29C 43/18* (2013.01); *B29C 43/34* (2013.01); *B29C 43/36* (2013.01);
(Continued)

(58) Field of Classification Search
CPC ...... B29C 2043/181; B29C 2043/3205; B29C 43/18; B29C 43/32; B29C 43/34;
(Continued)

(56) References Cited

U.S. PATENT DOCUMENTS 9,623,619 B2 4/2017 Havar et al.
9,725,184 B2 8/2017 Best, III
(Continued)

FOREIGN PATENT DOCUMENTS

DE 102016201584 A1 8/2017
EP 3147086 A1 3/2017
(Continued)

OTHER PUBLICATIONS

German Office Action dated Feb. 6, 2020; priority document.
(Continued)

*Primary Examiner* — Emmanuel S Luk
*Assistant Examiner* — Victoria Bartlett
(74) *Attorney, Agent, or Firm* — Greer, Burns & Crain, Ltd.

(57) ABSTRACT

In order to allow or improve a laminar air flow in a transition region between aerodynamic profile elements, a pressure plate arrangement is proposed. The pressure plate arrangement comprises a pressure plate body and at least one cover strip, in particular a sealing strip. The pressure plate body has an outlet region from which free-flowing sealant can exit during pressing. The cover strip already contains cured sealant and presses the free-flowing sealant flat in order to be able to form the transition region.

17 Claims, 25 Drawing Sheets

(51) Int. Cl.
  *B29C 43/32* (2006.01)
  *B29C 43/34* (2006.01)
  *B29C 43/36* (2006.01)
  *B29D 99/00* (2010.01)
  *B29L 31/30* (2006.01)
  *B64C 3/26* (2006.01)
  *B64F 5/10* (2017.01)

(52) U.S. Cl.
  CPC ............ *B29D 99/0053* (2013.01); *B64C 3/26* (2013.01); *B64F 5/10* (2017.01); *E04F 19/066* (2013.01); *B29C 2043/3205* (2013.01); *B29L 2031/3085* (2013.01); *E04F 19/063* (2013.01)

(58) Field of Classification Search
  CPC ............ B29C 43/36; B29C 2043/3621; B29L 2031/26; B29L 2031/3076; B29L 2031/3085; B29D 99/0053; B64C 3/26; B64C 1/12; B64C 1/069; B64F 5/10; E04F 19/062; E04F 19/063; E04F 19/066; E06B 2001/626
  See application file for complete search history.

(56) References Cited

U.S. PATENT DOCUMENTS

| | | |
|---|---|---|
| 9,821,538 B1 | 11/2017 | Harris et al. |
| 2013/0000821 A1* | 1/2013 | Parikh ................ B64C 7/00 156/60 |
| 2013/0037655 A1 | 2/2013 | Bradley et al. |
| 2014/0196831 A1 | 7/2014 | Ayres et al. |
| 2014/0326389 A1* | 11/2014 | Blanchard ............ B29C 73/12 156/64 |
| 2015/0102160 A1 | 4/2015 | Watanabe et al. |
| 2015/0125607 A1* | 5/2015 | Schmitz ................ E04F 21/162 15/235.4 |
| 2017/0008616 A1 | 1/2017 | Davies et al. |
| 2017/0080575 A1 | 3/2017 | Meyer et al. |
| 2018/0155012 A1 | 6/2018 | Hoffmeister et al. |
| 2019/0016107 A1* | 1/2019 | Bertrand ................ B32B 37/12 |

FOREIGN PATENT DOCUMENTS

| | | |
|---|---|---|
| EP | 3178627 B1 | 6/2017 |
| EP | 3301012 A1 | 4/2018 |
| WO | 2013136926 A1 | 8/2015 |

OTHER PUBLICATIONS

Great Britain Combined Search and Examination Report for corresponding GB Patent Application No. 2007356.5 dated Feb. 10, 2021; 14 pages.

\* cited by examiner

PRESSURE PLATE ARRANGEMENT, PRODUCTION ARRANGEMENT, DEVICE AND METHOD FOR PRODUCING A TRANSITION REGION BETWEEN AERODYNAMIC PROFILE ELEMENTS

CROSS-REFERENCES TO RELATED APPLICATIONS

This application claims the benefit of the German patent application No. 10 2019 113 566.4 filed on May 21, 2019, the entire disclosures of which are incorporated herein by way of reference.

BACKGROUND OF THE INVENTION

The invention relates to a pressure plate arrangement for producing a transition region between two aerodynamic profile elements, wherein the transition region allows laminar fluid flow. The invention further relates to a corresponding production arrangement and also to a device and to a method for producing the corresponding transition region.

BACKGROUND OF THE INVENTION

In order to reduce the friction losses during flight and thus save fuel, use is made of laminar flow technologies which are known as natural laminar flow (for short: NLF) or hybrid laminar flow control (for short: HLFC). An example of HLFC is provided by wing leading edges perforated with micro-openings. This laminar technology can generate increased outlay and effort in the production and/or maintenance if it is used on leading edge sections of the wing, of the vertical tail plane (for short: VTP) or rudder unit, of the horizontal tail plane (for short: HTP) or elevator unit or the like. The leading edge section of these regions typically comprises a leading edge part and the wing box part, VTP box part or HTP box part. At the present time, it is difficult and complicated to join these parts in such a way as to meet the requirements for good laminar flow. One requirement is for example a step height and/or waviness of the surface of less than 0.1 mm.

EP 3 301 012 A1 discloses a connection arrangement for the aerodynamically smooth connection of two profile elements.

EP 3 147 086 A1 and US 2017/0 080 575 A1 disclose a method for controlling a manufacturing robot in order to perform surface treatments or to produce connections between a plurality of individual elements.

EP 3 178 627 B1 discloses a method for filling a groove with a filling compound.

Hitherto, the leading edge sections have been fixed by means of rivets or bolts such that the rivet or bolt heads are flush with the surrounding surfaces of the profile elements. The gaps are filled manually with sealant by covering the surroundings of the joint with a mask, the sealant is introduced into the joint, the sealant is smoothed by means of a spatula, the mask is removed and the sealant is cured. If it is not possible to achieve sufficient smoothness with the first application, a second (or further) application(s) can be carried out.

SUMMARY OF THE INVENTION

An object on which the invention is based is to improve the manufacture of the transition region between aerodynamic profile elements, in particular with regard to manufacturing time and manufacturing quality.

The invention provides a pressure plate arrangement for producing a transition region between a plurality of profile elements, wherein the transition region is designed to allow a laminar fluid flow flowing from a first profile element via the transition region to a second profile element, wherein the pressure plate arrangement is designed for pressing free-flowing or pasty sealant, wherein the pressure plate arrangement comprises a pressure plate body and at least one cover strip, wherein the pressure plate body has an outlet region which is designed to allow the free-flowing and/or pasty sealant to exit during pressing thereof.

It is preferred that the cover strip takes the form of a sealing strip which contains cured sealant.

It is preferred that the cover strip takes the form of a metal strip.

It is preferred that the outlet region is arranged on a longitudinal edge region extending parallel to a longitudinal direction of the pressure plate body.

The pressure plate arrangement preferably comprises a second outlet region which is arranged on a second longitudinal edge region extending parallel to a longitudinal direction of the pressure plate body and spaced apart from the longitudinal edge region in the transverse direction of the pressure plate body.

Alternatively or additionally, the outlet region can also be arranged on the two transverse ends of the pressure plate body.

It is preferred that the pressure plate body has a plurality of supporting projections for supporting the pressure plate body on a further element.

It is preferred that the supporting projections are arranged spaced apart from one another in a longitudinal direction of the pressure plate body and delimit outlet gaps of the outlet region between them.

It is preferred that some of the supporting projections are designed as positioning projections.

It is preferred that the pressure plate body comprises a pressure plate main body. It is preferred that the supporting projections project from the pressure plate main body. It is preferred that, as seen in plan view, the pressure plate main body, together with the supporting projections, delimits the outlet gaps only on three sides. It is preferred that, as seen in plan view, the fourth side of the outlet gap can be delimited by the further element.

It is preferred that the pressure plate body, in particular the pressure plate main body, has a pressure surface for pressing free-flowing and/or pasty sealant.

It is preferred that the pressure plate body, in particular the pressure plate main body, has a non-stick region, in particular a pressure surface, with non-stick properties in relation to the free-flowing and/or pasty sealant.

It is preferred that the cover strip is releasably fastened to the pressure plate body, in particular to the pressure plate main body, more particularly to the pressure surface.

It is preferred that the pressure plate body has a plurality of positioning projections for positioning the pressure plate body relative to a further element. It is preferred that the positioning projections are arranged spaced apart from one another in a longitudinal direction of the pressure plate body, in particular with a larger spacing than the supporting projections, preferably an integral multiple of the spacing of the supporting projections, and limit outlet gaps of the outlet region between them. It is preferred that at least some of the positioning projections are additionally designed as supporting projections.

It is preferred that the positioning projections project from the pressure plate main body.

It is preferred that a further cover strip is provided which is spaced apart from the cover strip in the longitudinal direction and delimits a filling gap with the cover strip.

The pressure plate arrangement and/or the production arrangement preferably comprise/comprises a crosslinking device which is designed for partially crosslinking and/or curing free-flowing or pasty sealant and which is preferably arranged on the pressure plate body, in particular the pressure plate main body.

It is preferred that the crosslinking device has a heating device for heating free-flowing and/or pasty sealant in order to partially crosslink and/or cure the free-flowing and/or pasty sealant.

It is preferred that the crosslinking device has an irradiating device for irradiating free-flowing and/or pasty sealant in order to partially crosslink and/or cure the free-flowing and/or pasty sealant. It is preferred that the irradiating device is designed to emit light radiation, in particular UV radiation, visible radiation and/or IR radiation.

It is preferred that the cover strip is designed to be transparent to the radiation of the irradiating device.

It is preferred that the pressure plate arrangement, in particular the pressure plate body, more particularly the pressure plate main body, is designed to be transparent to the radiation of the irradiating device.

It is preferred that the pressure plate body is designed as a shaping pressure plate body which is designed for shaping aerodynamic surfaces, aerodynamic features, such as for instance fins, riblets, sharklets or NACA inlets, and/or for shaping functional features, such as for instance beads, service accesses and the like.

The pressure plate arrangement preferably comprises a heating device which is preferably arranged on the pressure plate body, in particular integrated in the pressure plate main body. It is preferred that the heating device is designed for heating free-flowing sealant in order to cure the free-flowing sealant.

It is preferred that at least one outlet gap has an outlet gap length in the longitudinal direction of the pressure plate body that is greater than the supporting projection width along the longitudinal direction.

It is preferred that at least one outlet gap has an outlet gap length in the longitudinal direction of the pressure plate body that is designed to be 5 times to 15 times greater than the supporting projection width along the longitudinal direction.

It is preferred that at least one outlet gap has an outlet gap length in the longitudinal direction of the pressure plate body that is designed to be 7 times to 12 times greater than the supporting projection width along the longitudinal direction.

It is preferred that at least one outlet gap has an outlet gap length in the longitudinal direction of the pressure plate body that is designed to be 10 times greater than the supporting projection width along the longitudinal direction.

It is preferred that at least one outlet gap has an outlet gap length in the longitudinal direction of the pressure plate body that is designed to be less than the supporting projection width along the longitudinal direction.

It is preferred that at least one outlet gap has an outlet gap length in the longitudinal direction of the pressure plate body that is $1/8$ to $1/2$ of the supporting projection width along the longitudinal direction.

It is preferred that at least one outlet gap has an outlet gap length in the longitudinal direction of the pressure plate body that is $1/8$ to $1/3$ of the supporting projection width along the longitudinal direction.

It is preferred that at least one outlet gap has an outlet gap length in the longitudinal direction of the pressure plate body that is $1/4$ of the supporting projection width along the longitudinal direction.

The invention provides a device for producing a transition region between a plurality of profile elements, wherein the transition region is designed to allow a laminar fluid flow flowing from a first profile element via the transition region to a second profile element, wherein the device comprises a frame which can be releasably fastened to at least one profile element, a pressure plate arrangement designed, in particular preferred, for pressing free-flowing sealant, and a pressing device which is designed to press the pressure plate arrangement in the direction of the profile elements in such a way that free-flowing sealant can be shaped and/or cured to form a transition region.

The device preferably comprises a plurality of aligning elements which are releasably fastened to the profile elements and which are designed to interact with the pressure plate arrangement in such a way that the pressure plate arrangement can be positioned along a joint portion formed by the profile elements so as to follow the joint portion. Consequently, both parallel extending groove shapes and other groove shapes, for instance those which have a curved profile, can be covered by the pressure plate arrangement.

It is preferred that the pressing device is designed to move the pressure plate arrangement by means of displacement with a main movement direction along the vertical direction in order to press the free-flowing sealant.

It is preferred that the pressing device is designed to move the pressure plate arrangement by means of a rotational movement about an axis parallel to a joint portion formed by the profile elements in order to press the free-flowing sealant.

It is preferred that the pressing device is designed to press the supporting projections and/or the positioning projections onto the profile elements.

It is preferred that the frame extends in a longitudinal direction and comprises supporting feet spaced apart along the longitudinal direction in order to releasably fasten the frame.

It is preferred that the frame has a stiffening structure, in particular a framework-like stiffening structure. It is preferred that the stiffening structure has a plurality of transverse struts.

It is preferred that at least one or each supporting foot comprises a releasable fastening element for releasably fastening the frame.

It is preferred that the releasable fastening element comprises a threaded portion, a magnetic element or a suction cup for releasable fastening.

It is preferred that the frame is composed of a plurality of rod elements.

It is preferred that the pressing device has a holding plate which, during pressing of the pressure plate arrangement, takes hold of the pressure plate arrangement.

It is preferred that the pressing device has a pressure force generator for generating a pressure force on the pressure plate arrangement. It is preferred that the pressure force generator has a spring element or an actuator.

It is preferred that the pressing device has a control device for controlling the pressing operation and/or the pressure force generator. It is preferred that the pressing device has a force-measuring device for measuring the pressure force for the purpose of process control and/or process monitoring. It is preferred that the force-measuring device has at least one load cell for measuring the pressure force.

The invention provides a production arrangement for producing a transition region between a plurality of profile elements, wherein the transition region is designed to allow a laminar fluid flow flowing from a first profile element via the transition region to a second profile element, wherein the production arrangement comprises:
- a plurality of aerodynamic profile elements which together define a joint portion; and
- a preferred pressure plate arrangement, wherein the cover strip is arranged on/in the joint portion.

The production arrangement preferably comprises a quantity of free-flowing sealant which is arranged on the joint portion.

The production arrangement preferably comprises a quantity of excess sealant which, on account of the pressing of the quantity of free-flowing sealant by means of the pressure plate arrangement, has exited from an outlet region, in particular outlet gap, of the pressure plate arrangement.

It is preferred that the joint portion comprises a groove region with a groove depth and a flat region adjoining the groove region with a flat region depth, wherein the groove depth is greater than the flat region depth.

It is preferred that the groove region has free-flowing filling compound on a groove bottom, in particular such that the groove region is filled.

It is preferred that the groove region contains an insert inserted into the groove region. It is preferred that the insert seizes the free-flowing filling compound. It is preferred that the insert partially forces the free-flowing filling compound out of the groove region.

It is preferred that the insert has at least one centering element such that the insert is centered in the width direction of the groove region.

It is preferred that the quantity of uncured sealant is applied above the groove region and/or on the flat region.

It is preferred that the cover strip displaces the free-flowing sealant.

It is preferred that, to press the free-flowing sealant, the pressure plate arrangement can be moved and/or displaced in the main movement direction perpendicular to a surface of the aerodynamic profile elements.

It is preferred that the pressure plate arrangement can be rotated to press the free-flowing sealant.

The invention provides a production method for producing a transition region between a plurality of aerodynamic profile elements, wherein the transition region is designed to allow a laminar fluid flow flowing from an aerodynamic first profile element via the transition region to an aerodynamic second profile element, comprising the following steps:
a) Arranging the aerodynamic profile elements such that the aerodynamic profile elements define a joint portion;
b) Applying free-flowing sealant to the joint portion, and, to form the transition region, pressing the free-flowing sealant by means of a pressure plate arrangement delimiting an outlet gap for free-flowing sealant, wherein the quantity of the free-flowing sealant is dimensioned such that, during pressing, some of the free-flowing sealant exits from the outlet gap as excess sealant;
c) Curing the free-flowing sealant; and
d) Removing the excess sealant.

It is preferred that, in particular in step a), the joint portion comprises a groove region with a groove depth and a flat region adjoining the groove region with a flat region depth, wherein the groove depth is greater than the flat region depth.

It is preferred that, in particular before step b), free-flowing filling compound is applied to a groove bottom of the groove region, in particular until the groove region is filled.

It is preferred that, in particular before step b), an insert is inserted into the groove region. It is preferred that the insert displaces the free-flowing filling compound. It is preferred that the insert partially forces the free-flowing filling compound out of the groove region.

It is preferred that the insert has at least one centering element in order to arrange the insert centrally in the width direction of the groove region.

It is preferred that, in particular in step b), the uncured sealant is applied above the groove region and/or on the flat region.

It is preferred that, in particular in step b), a cover strip, which in particular contains cured sealant and/or contains a metal strip, is pressed in the direction of the joint portion in such a way that the cover strip displaces the free-flowing sealant.

It is preferred that, in particular in step b), the pressing occurs by means of a pressure plate body.

It is preferred that, in particular in step b), to press the free-flowing sealant, the pressure plate arrangement is moved in a main movement direction perpendicular to a surface of the aerodynamic profile elements.

It is preferred that the movement occurs in such a way that the free-flowing sealant is pressed from a central region of the joint portion, in particular of the flat region, to the two end regions of the joint portion, wherein the sealant exits through the outlet gap at at least one end region.

It is preferred that, in particular in step b), the pressure plate arrangement is rotated to press the free-flowing sealant.

It is preferred that, in particular in step b), the rotation occurs in such a way that the free-flowing sealant is pressed from one side of the joint portion to the other side of the joint portion, wherein the free-flowing sealant exits through the outlet gap on the other side.

It is preferred that, in particular in step b), the rotation occurs in such a way that the free-flowing sealant is pressed away from the side of the groove region along the flat region to the side of the flat region that is situated remotely from the groove region, wherein the free-flowing sealant exits through the outlet gap on the remotely situated side.

It is preferred that, in particular in step d), the removal occurs by means of cutting and/or grinding.

It is preferred that a preferred pressure plate arrangement is used in the method.

The invention provides a method for producing a cover strip for use in a device or a method as described above, comprising the following steps:
a) Applying free-flowing sealant, which is also used in one of the devices or the method, to a base plate, in particular a metal plate, more particularly an aluminum plate;
b) Pressing the free-flowing sealant to a defined thickness by means of a further plate in order to obtain a plate-shaped free-flowing sealant;
c) Curing the plate-shaped free-flowing sealant to form a plate-shaped cured sealant; and
d) Cutting the plate-shaped cured sealant in order to obtain the cover strip.

Technical effects and advantages will be explained in more detail below. It should be borne in mind that not all effects and advantages have to be realized simultaneously or to the same degree. It should also be borne in mind that the listing of the method steps a), b), c), . . . does not imply any order but serves merely for better reference. Rather, the order of the method steps results from the technical relationship or any particulars thereof.

In general, the procedure can be summarized as:

Cleaning the joint portion including the surrounding surfaces

Masking the surrounding surfaces of the joint portion

Fixing aligning elements (by means of the pressure plate)

Positioning the pressure plate, marking the position and removing the arrangement Fixing cover strip (consisting of cured sealant or other material (for example titanium)) to the pressure plate Activating or ultrafine cleaning of the joint portion (solvent, CO2, laser or plasma cleaning)

Applying filling compound in the deep groove region

Applying insert (insert preferably has a low coefficient of thermal expansion)

Applying sealant in the flat region (centrally along the profile chord or on the side to which the pressure plate is rotationally fixed)

Using a spatula with cutout or application device for applying the correct quantity of sealant (where appropriate in an automated manner)

Positioning the pressure plate above the sealant with the aid of the aligning elements Fixing the pressing device Pressing the pressure plate with the pressing device After curing the sealants, removing the pressing device, pressure plate and aligning elements Cutting off the excess sealant Removing the masking Smoothing the surface, for example by means of a fluid with smoothing properties and/or grinding The present invention presents a new application scheme for sealants whereby complex joint or step geometries can be treated in order to configure the transition region during production in such a way that a laminar fluid flow is allowed or improved. The idea is based on a combination of an already cured cover strip and a specifically shaped pressure plate. An excess quantity of non-cured sealant is distributed in the joint by means of the pressure plate and the cover strip in such a way that the joint can be completely filled. The pressure plate can define an outlet gap with an edge region of the joint, from which outlet gap excess sealant can exit. Consequently, the sealant can be distributed in such a way that a flush transition between the profile elements forming the joint results. The step height and/or waviness of the surface of the transition can thus be reduced to below 0.1 mm, thereby allowing or improving a substantially undisturbed laminar fluid flow from one profile element via the transition to the other profile element. A heater in the pressure plate can further improve the curing rate.

Hitherto, joint transitions of complex shape have been planned such that the filling compounds do not have to be overcoated. This limits the selection of the filling compounds to be used, for example on account of UV resistance, water absorption, ageing, erosion and the like. The use of an insert having a low coefficient of thermal expansion makes it possible to minimize the thermally induced shrinkage or the thermally induced expansion to such an extent that a coating of the joint transition is made possible as a result. In the case of the complex joint transitions described herein, in particular with a relatively deep groove region, the cover strip, in addition to the insert and sealant, can further reduce the thermally induced shrinkage or the thermally induced expansion, with the result that a coating layer can be applied to the crosslinked or cured sealant/filling compound without the coating layer cracking or flaking as a result of the movement of the filling compound situated below. As a result, a greater selection of sealants or filling compounds can be used.

One possibility is also that the pressure plate body can be directly connected to the frame, with the result that the frame is designed as a kind of gantry robot. The frame has for example linear axes by means of which the pressure plate can be positioned. In this case, it is particularly preferred to dispense with the positioning projections.

Furthermore, a suctioning device for excess sealant can be arranged in the vicinity of the outlet gaps. In this case, there is no need to carry out a time-consuming masking process.

In order to produce a cover strip, filling compound is applied centrally to a planar surface, for example a base plate (for example made of aluminum), which is provided with a non-stick surface (for example PTFE adhesive film). A further plate (for example made of aluminum), which can likewise be provided with a non-stick surface (for example PTFE adhesive film), is pressed with a fixed spacing onto the base plate. The spacing can be set for example via sheet metal strips. After the filling compound has been cured, the upper plate is removed. A film (for example PTFE) is applied to the filling compound. Together with the film, the cured filling compound cover strip is removed from the base plate and placed on the side with the film onto a work surface. A film (for example PTFE) is then likewise applied to the filling compound side situated at the top. In this state, the filling compound cover strip can be stored or it is cut directly to the required dimensions. This cut can occur for example using a cutting template (for example metal plate). Alternatively, the shape can also be punched out.

BRIEF DESCRIPTION OF THE DRAWINGS

Further advantages and effects can result from the exemplary embodiments explained in more detail on the basis of the appended schematic drawings, in which.

DETAILED DESCRIPTION OF THE PREFERRED EMBODIMENTS

Figure 1:
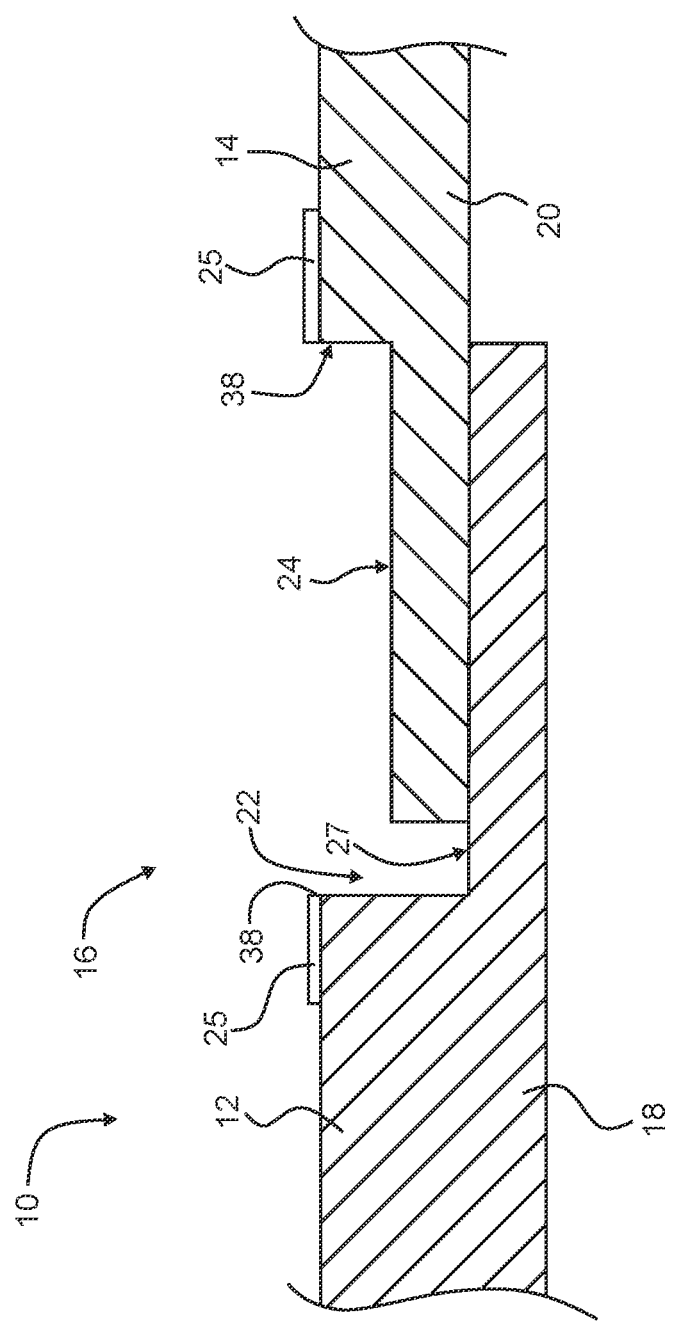
FIG. 1 to FIG. 6 show an exemplary embodiment of a production method on the basis of cross sections.

Reference is made to FIG. 1 to FIG. 6, which show a sequence of production arrangements 10 in cross section. A first profile element 12 and second profile element 14 define a joint portion 16. The first profile element 12 can be a wing body 18, for example. The second profile element 14 can be a wing leading edge module 20 designed for the wing body 18. The wing leading edge module 20 can contain, for example, deicing mechanisms, flow control mechanisms (for example microperforation for HLFC) or the like. Also conceivable is a use of the ideas presented herein on the vertical tail plane (VTP) or the horizontal tail plane (HTP) on the respective bodies and leading edge modules.

The first profile element 12 is manufactured, for example, from metal or preferably manufactured from (carbon-)fiber-reinforced plastic. The second profile element 14 can be manufactured from light metal, for example aluminum or titanium, or from a light metal alloy. The profile elements 12, 14 can also be parts of a VTP, HTP or of a lift aid.

As evident in FIG. 1, the joint portion 16 has a groove region 22 and a flat region 24. The groove region 22 has a groove depth which is greater than a flat region depth of the flat region 24. A typical groove depth is, for example, between 3 mm and 10 mm, in particular 5 mm. The flat region depth is, for example, 0.5 mm to 2 mm, in particular 1 mm. A masking 25 is preferably mounted on the raised edges of the groove region 22 and of the flat region 24 and, in particular, at further points at which no pasty sealant is intended to adhere.

The profile elements 12, 14 can be fastened to one another in a manner known per se, for example by means of bolts or rivets.

Figure 2:
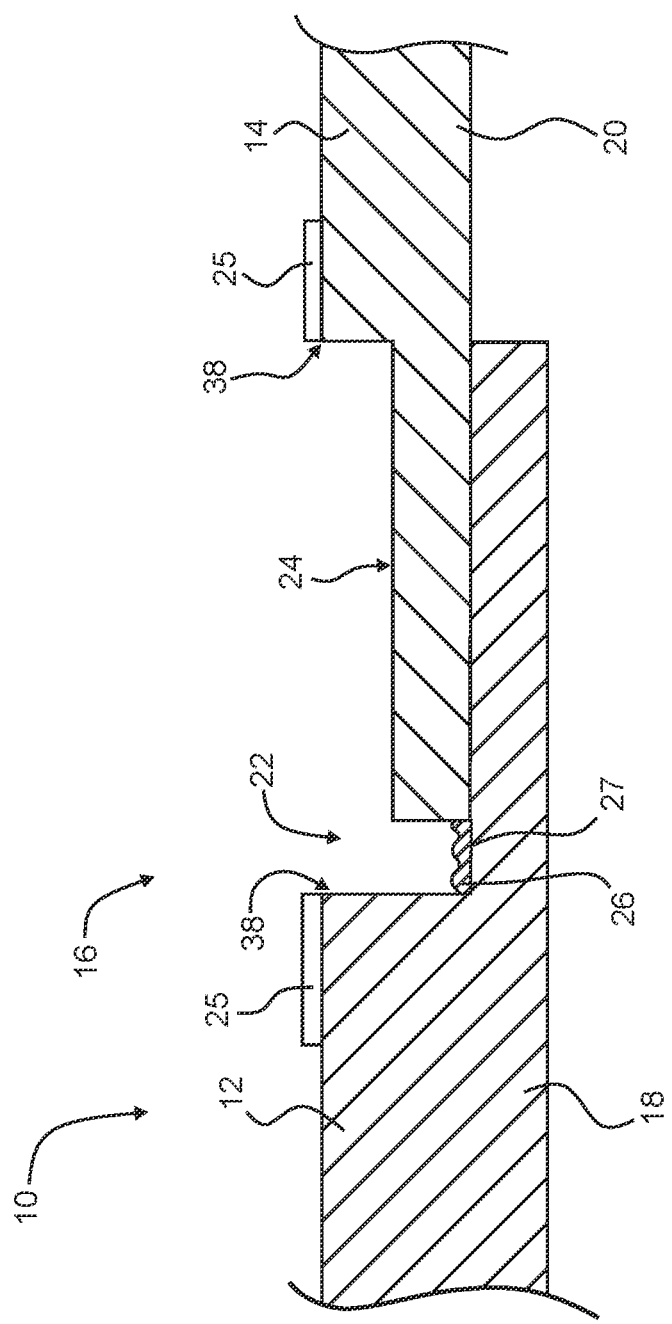

As illustrated in FIG. 2, in one step a free-flowing or pasty filling compound 26 can be applied to a groove bottom 27 of the groove region 22. The filling compound 26 can also be measured in such a way that the groove region 22 is filled. The filling compound 26 can be, for example, a polysulfide-based filling compound or a similar two-component material, in particular two-component material comprising binder and curing agent.

Figure 3:
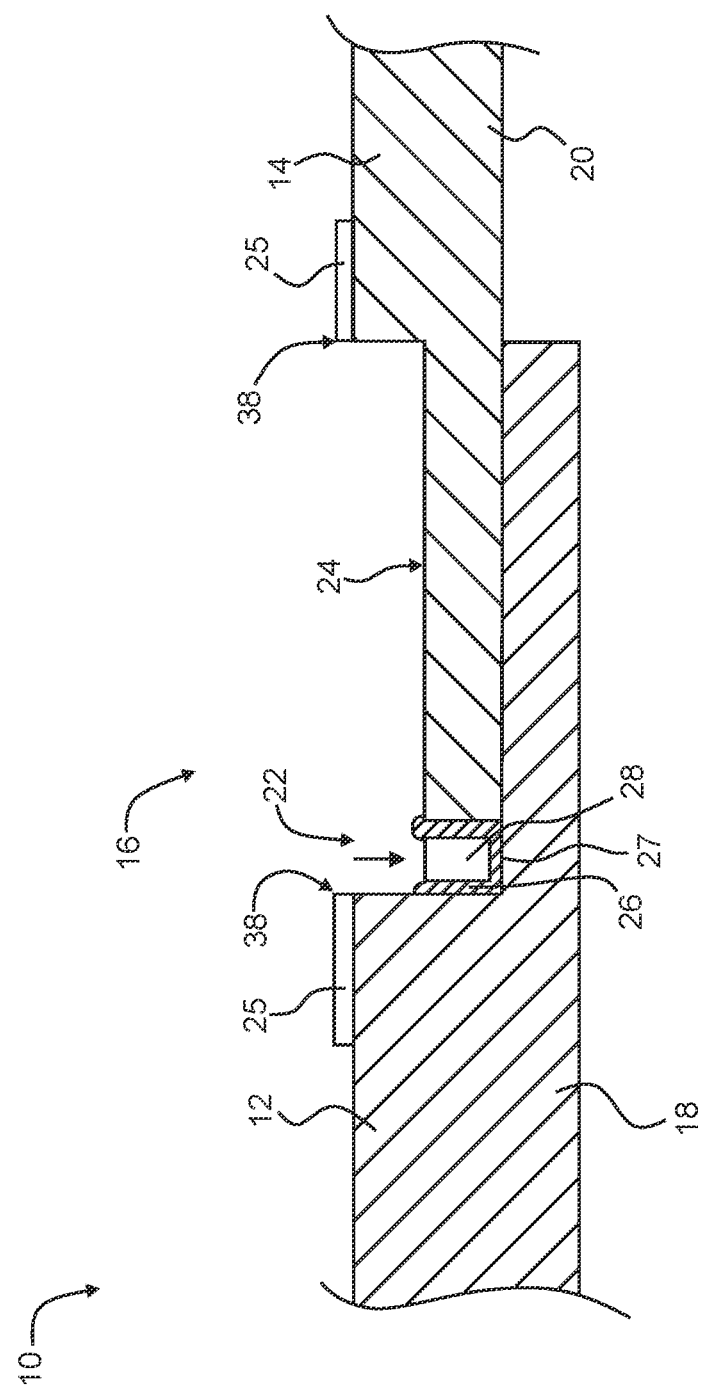

As particularly evident in FIG. 3, in one step an insert 28 can be inserted into the groove region 22. The quantity of the filling compound 26 is preferably measured such that, together with the insert 28, the groove region 22 is completely filled. The insert 28 can be, for example, a plastic strip comprising epoxy, GRP or CRP. It is also conceivable that the insert 28 is a woven fabric or laid scrim which can be infused with the filling compound 26 or consists exclusively of the filling compound 26.

Figure 24:
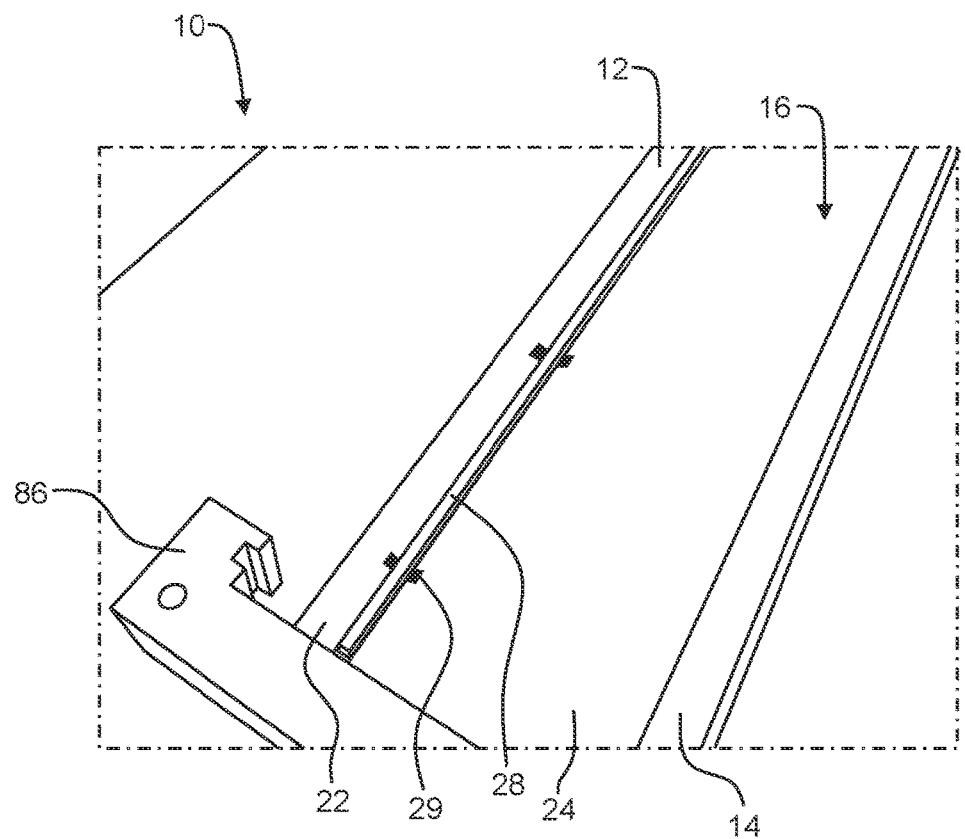

As illustrated in more detail in FIG. 24, the insert 28 can have a plurality of centering elements 29 by means of which the insert 28 can be positioned centrally in the groove region 22.

It is possible by means of a suitable insert 28 and/or suitable filling compound 26 to prevent excess shrinkage (shrinkage during curing, thermally induced shrinkage and/or geometrically induced shrinkage) which could otherwise as a result adversely affect the sought-after surface quality for a laminar fluid flow.

Figure 4:
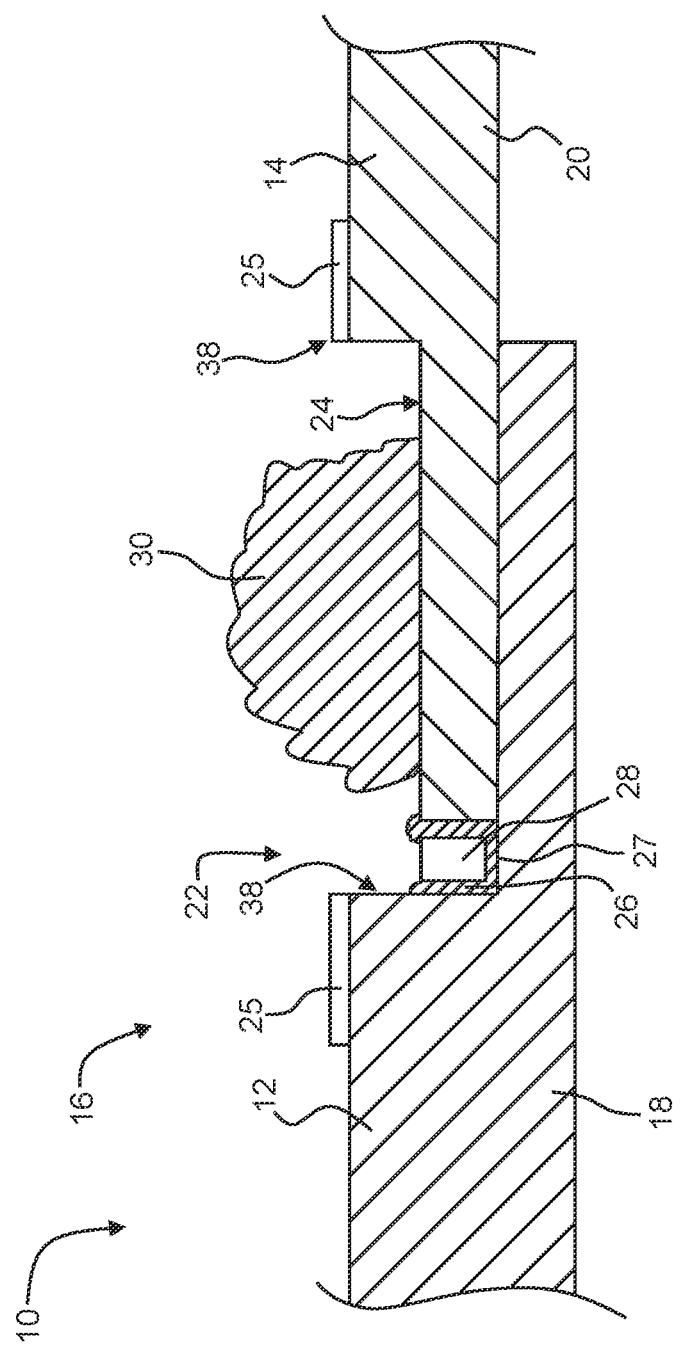

Furthermore, in one step visible from FIG. 4, an excess quantity of free-flowing or pasty sealant 30 can be applied to the flat region 24, in particular as centrally as possible.

Figure 5:
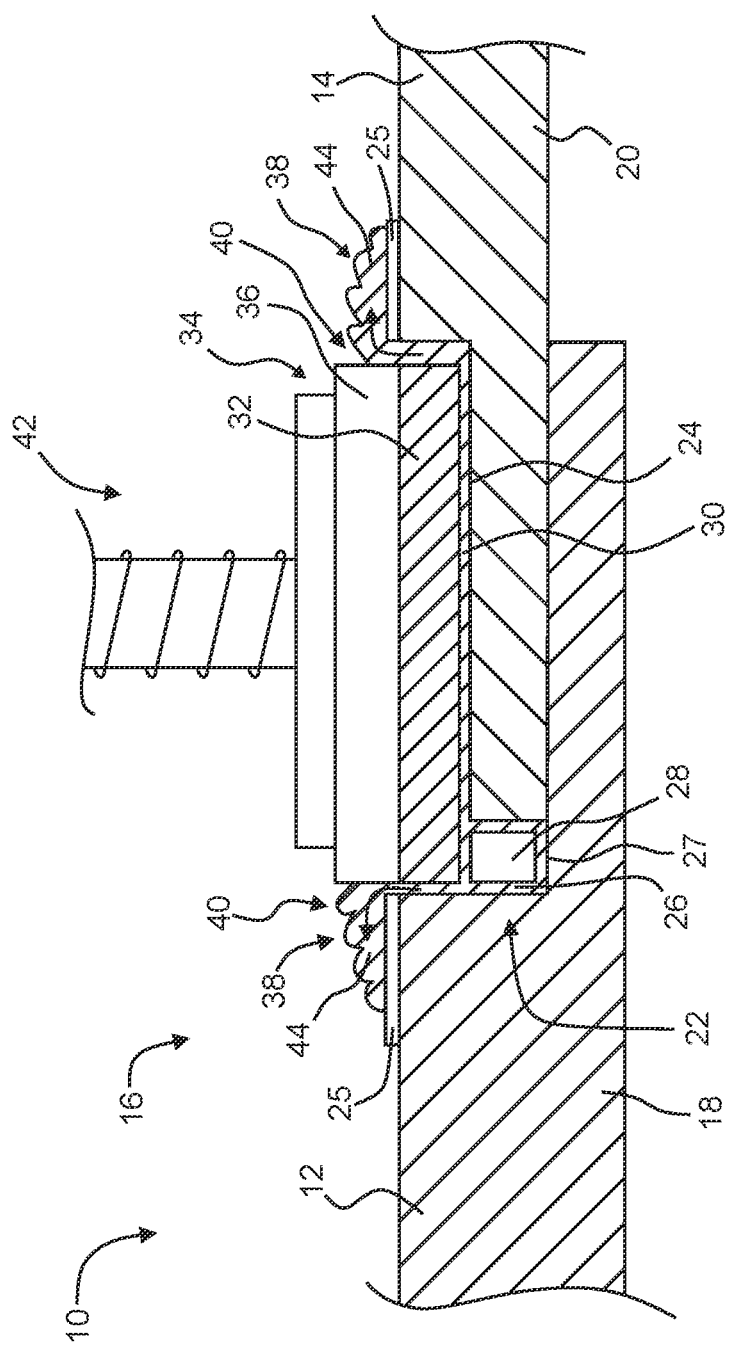

Furthermore, as evident from FIG. 5, a cover strip 32 is arranged on the flat region 24. The cover strip 32 preferably contains the same sealant as the free-flowing or pasty sealant 30, but it is cured.

The cover strip 32 is part of a pressure plate arrangement 34 which, in addition to the cover strip 32, comprises a pressure plate body 36. The pressure plate arrangement 34 will be explained in more detail later.

In the present case, the pressure plate arrangement 34, in particular the pressure plate body 36, in each case defines an outlet gap 40 with each edge 38 of the joint portion 16. The outlet gap 40 is delimited by the pressure plate body 36 on three sides and on the fourth side by each profile element 12, 14.

The pressure plate arrangement 34 is pressed by means of a production device 42 (also described in more detail later) in the direction of the joint portion 16. Here, excess sealant 44 exits from the outlet gap 40.

In this state, the free-flowing or pasty sealant 30 is partially crosslinked or cured, for example by thermal activation.

Figure 6:
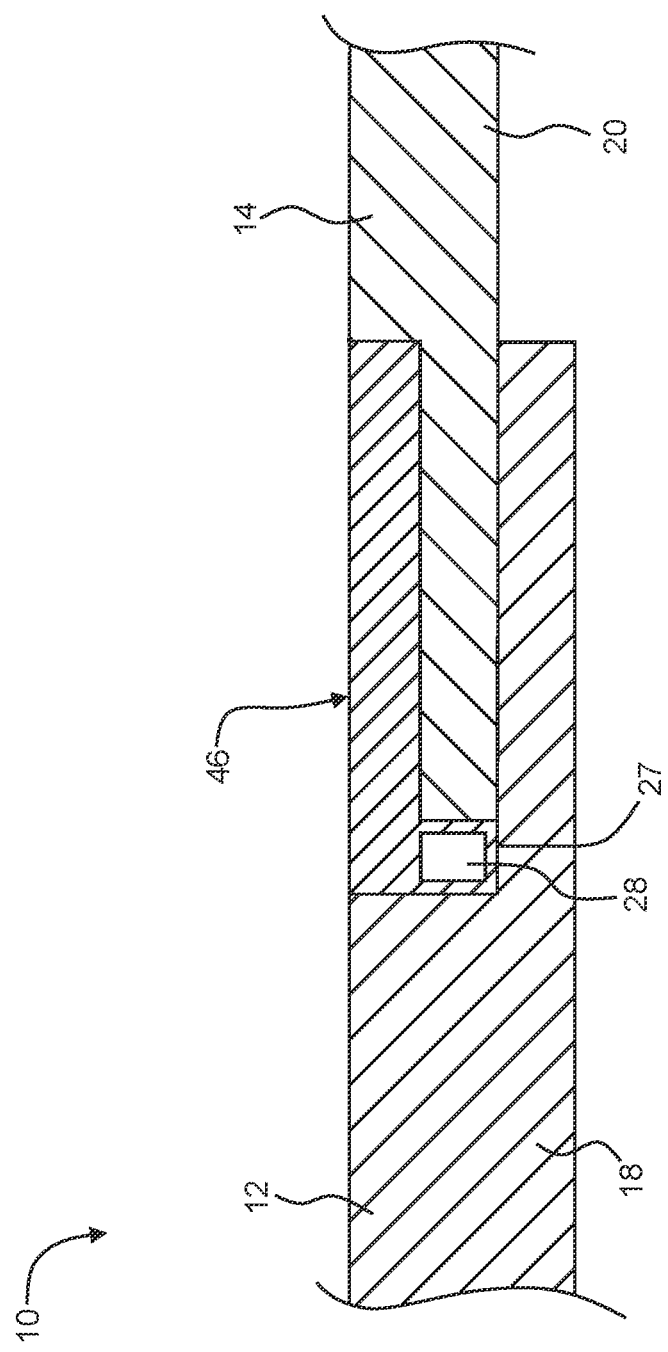

As illustrated in particular in FIG. 6, the cured excess sealant can then be removed. In addition, the processed joint portion 16 can also be levelled in order to obtain the desired surface quality. The masking 25 can then be removed.

Overall, this procedure provides a transition region 46 which has considerably improved laminar flow properties.

This procedure is also applicable to those points of aircraft that were unable to be treated hitherto. It is thus also possible for points which were unable to be coated hitherto now to be provided with a protective coating layer. Furthermore, the laminar flow behavior can also be improved at these points. In addition, the procedure described herein can shorten the manufacturing or repair time. It is thus possible for instance for the insert 28 to be seized at one end and removed from the groove region 22. Here, the cured sealant 52 and hence the cover strip 32 are seized by the insert 28 such that the transition region 46 can be exposed overall over its whole area. Consequently, a replacement or an inspection of one of the profile elements 12, 14 is possible without relatively great effort. The joint portion 16 can then be newly treated again and provided with the transition region 46.

Reference will be made below to FIG. 7 to FIG. 14, which show a sequence of production arrangements 10 in cross section.

A first profile element 12 and second profile element 14 define a joint portion 16. The first profile element 12 can be a wing body 18, for example. The second profile element 14 can be a wing leading edge module 20 designed for the wing body 18. The wing leading edge module 20 can contain, for example, deicing mechanisms, flow control mechanisms or the like.

The first profile element 12 is preferably manufactured from (carbon-)fiber-reinforced plastic. The second profile element 14 can be manufactured from light metal, for example aluminum or titanium, or from a light metal alloy. The profile elements 12, 14 can also be parts of a VTP, HTP or of a lift aid.

Figure 7:
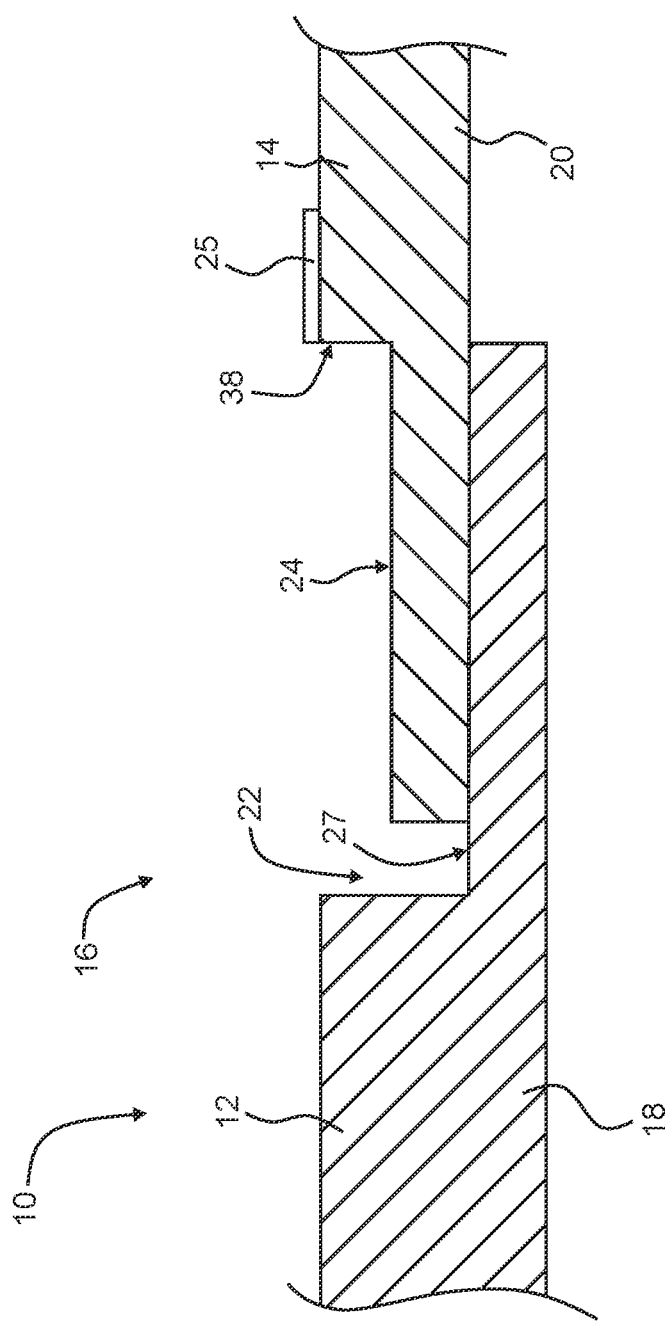
FIG. 7 to FIG. 14 show an exemplary embodiment of a production method on the basis of cross sections.

As evident from FIG. 7, the joint portion 16 has a groove region 22 and a flat region 24. The groove region 22 has a groove depth that is greater than a flat region depth of the flat region 24. A typical groove depth is for example between 3 mm and 10 mm, in particular 5 mm. The flat region depth is for example 0.5 mm to 2 mm, in particular 1 mm.

The profile elements 12, 14 can be fastened to one another in a manner known per se, for example by means of bolts or rivets.

Figure 8:
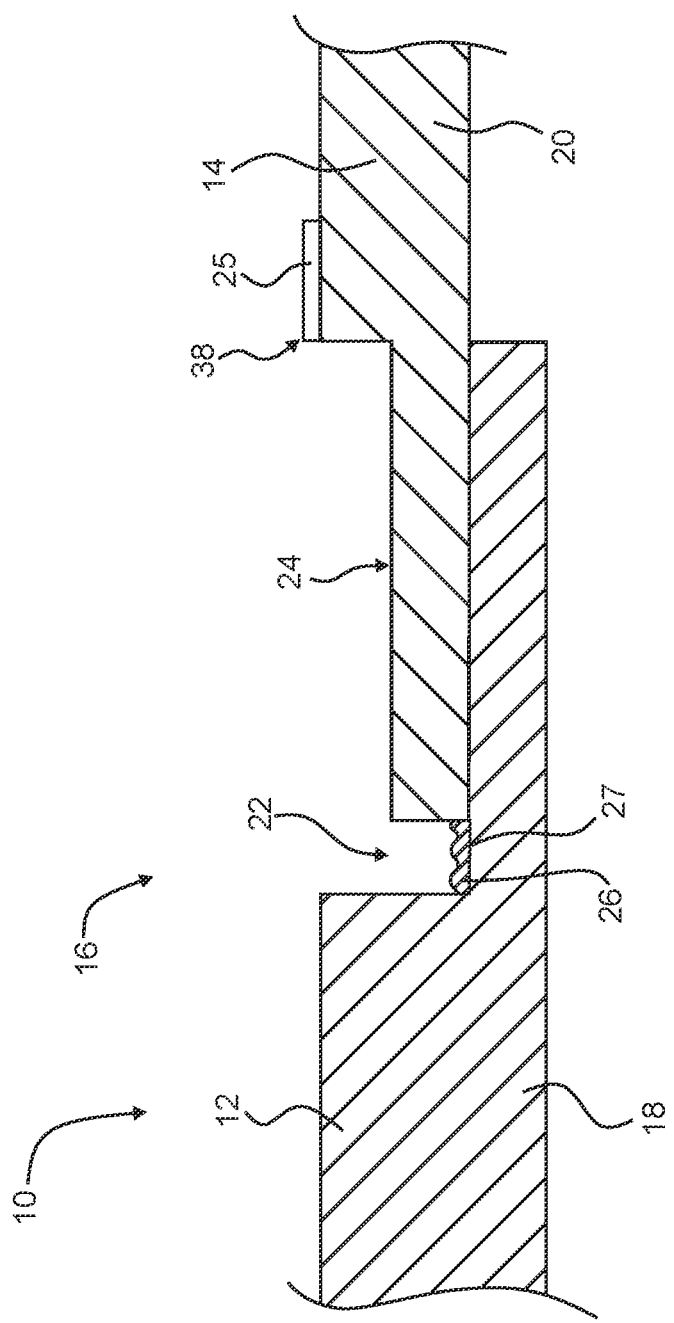

As illustrated in FIG. 8, in one step a filling compound 26 can be applied to a groove bottom 27 of the groove region 22. The filling compound 26 can also be measured such that the groove region 22 is filled. The filling compound 26 can be, for example, a polysulfide-based filling compound or a similar two-component material, in particular a two-component material consisting of binder and curing agent.

Figure 9:
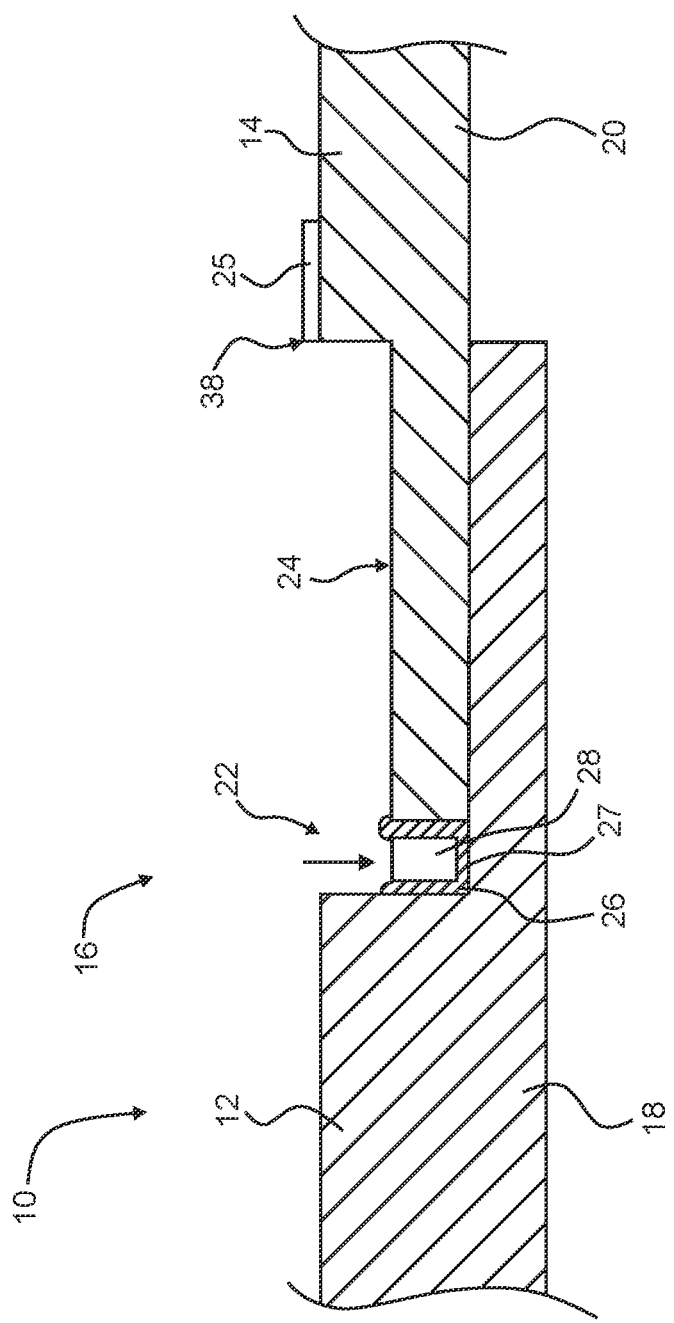

As evident in particular in FIG. 9, in one step an insert 28 can be inserted into the groove region 22. The quantity of the filling compound 26 is preferably measured such that, together with the insert 28, the groove region 22 is completely filled. The insert 28 can be, for example, a plastic strip consisting of epoxy, GRP or CRP. It is also conceivable that the insert 28 is a woven fabric or laid scrim which can be infused with the filling compound 26 or consists exclusively of filling compound 26.

It is possible by means of a suitable insert 28 and/or suitable filling compound 26 to prevent excess shrinkage which could otherwise as a result adversely affect the sought-after surface quality for a laminar fluid flow.

Figure 10:
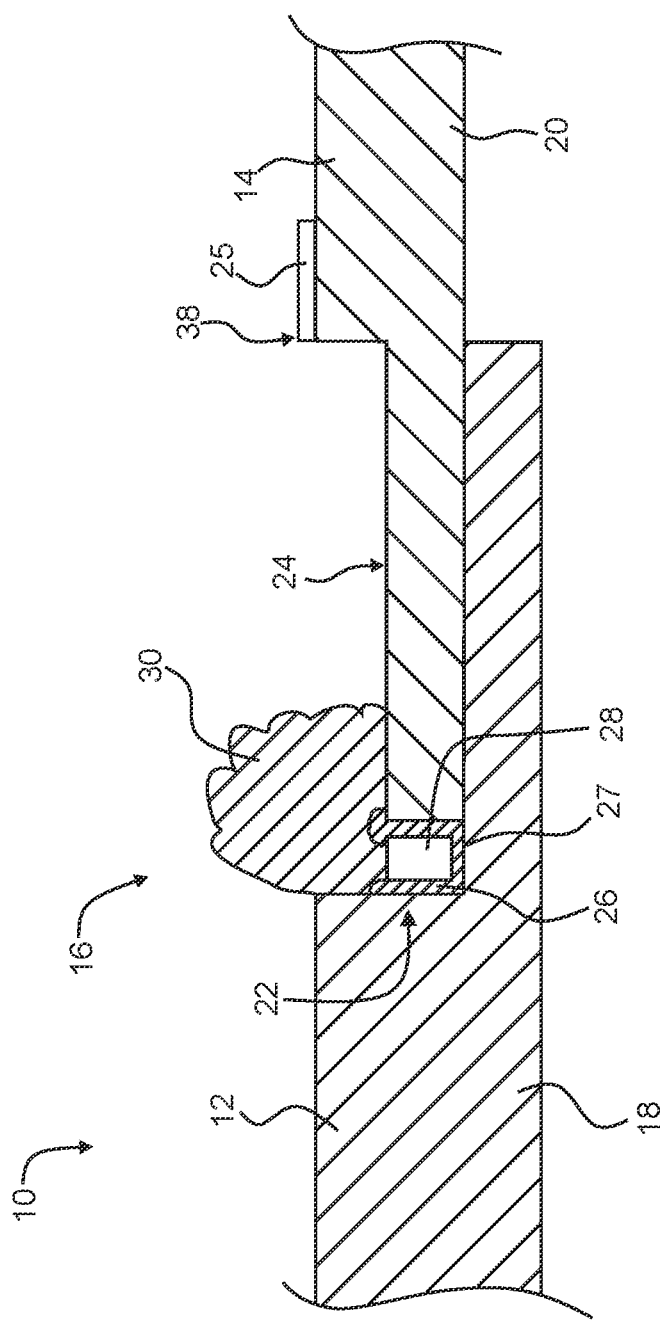
Figure 22:
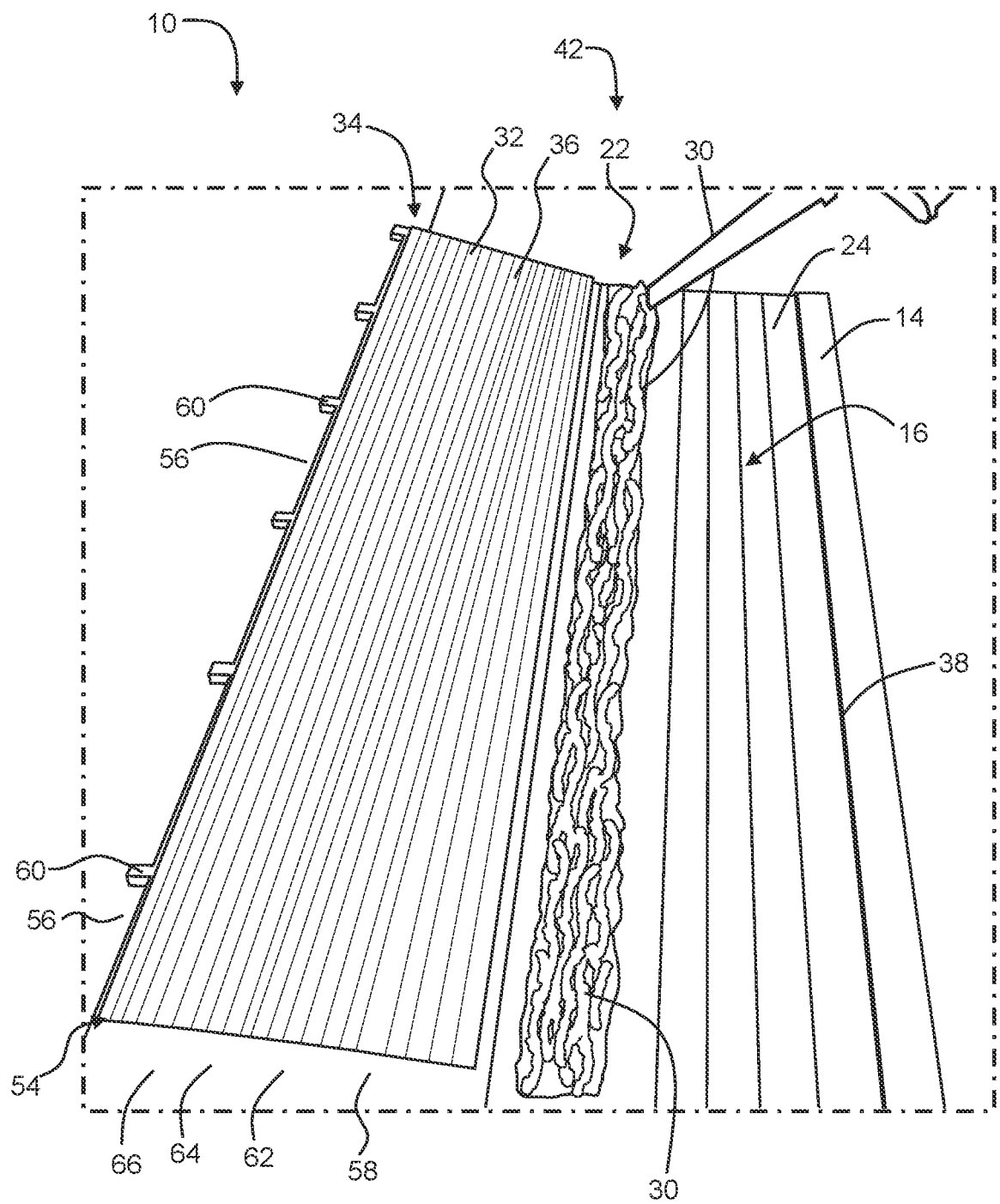

Furthermore, in one step visible from FIG. 10 and FIG. 22, an excess quantity of free-flowing or pasty sealant 30 can be applied to the side of the groove region 22, in particular directly above the groove region 22.

Figure 11:
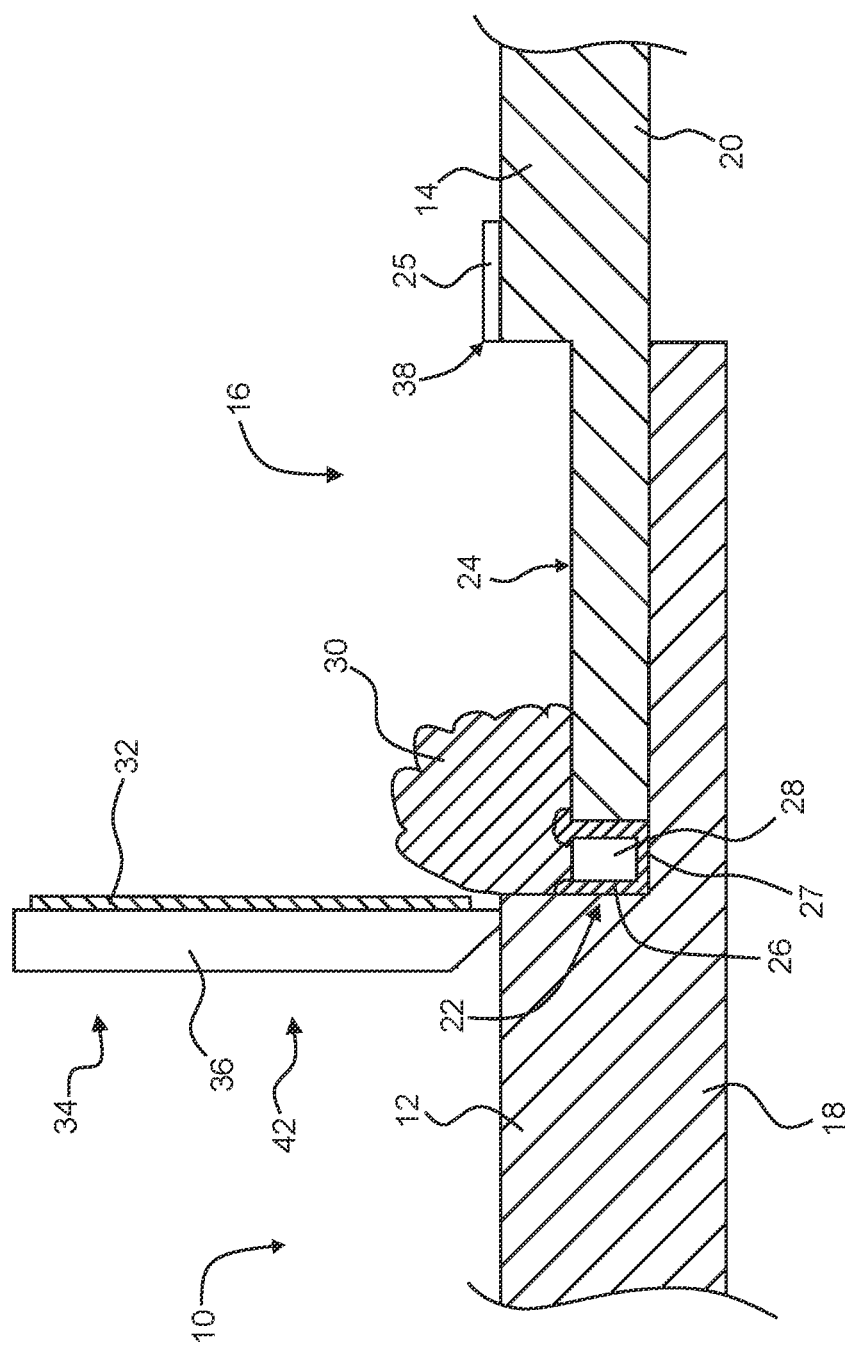
Figure 12:
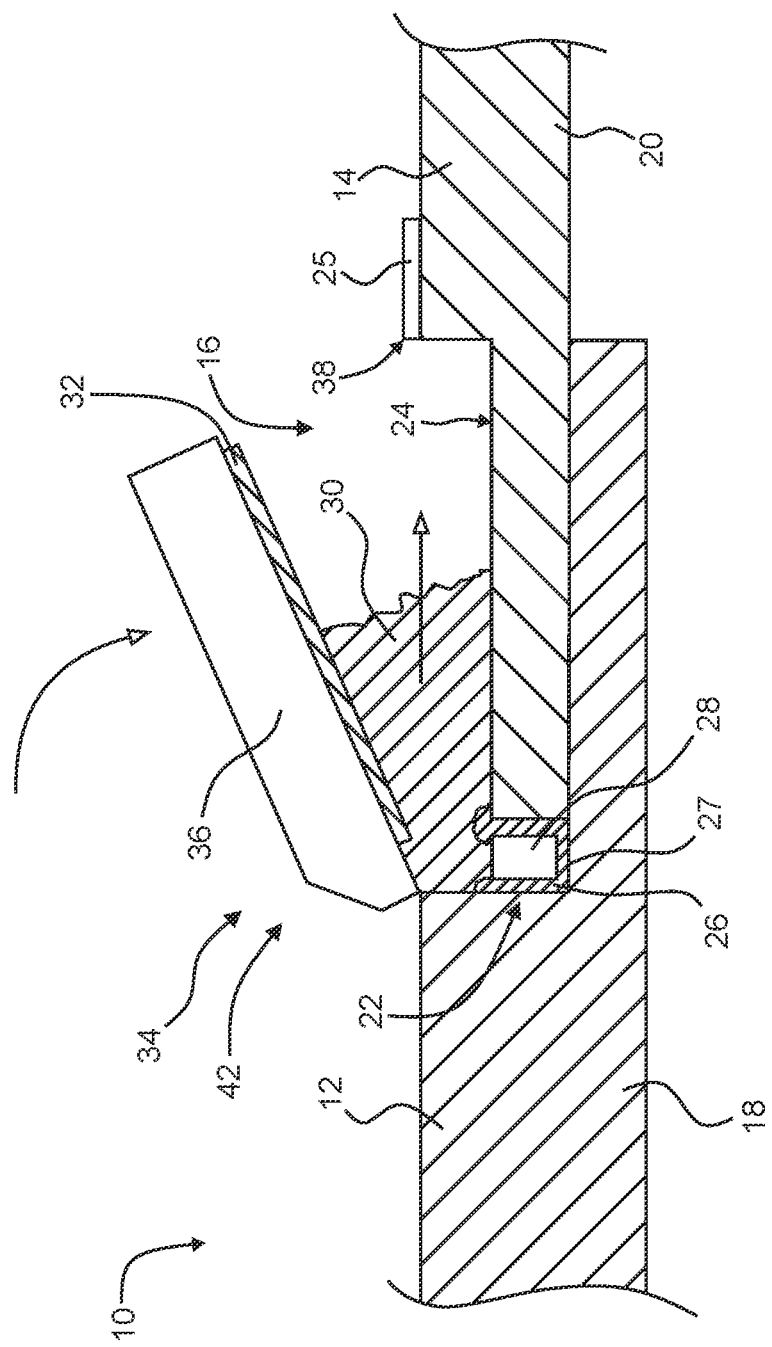

Furthermore, as evident in FIG. 11, a pressure plate arrangement 34 is arranged on the side of the groove region 22. The pressure plate arrangement 34 contains a cover strip 32. The cover strip 32 preferably contains the same sealant as the free-flowing sealant 30, but it is cured. The cover strip 32 is then also referred to as a sealing strip.

The pressure plate arrangement 34 also comprises, in addition to the cover strip 32, a pressure plate body 36. The pressure plate arrangement 34 is placed, on the side of the groove region 22, onto the edge of the joint portion 16 and, as illustrated in more detail in FIG. 12, tilted in the direction of the other edge of the joint portion 16, with the result that the free-flowing sealant 30 is pressed from the groove region 22 along the flat region 24 to the other edge of the joint portion 16. The pressure plate arrangement 34 can then be fixed.

Figure 13:
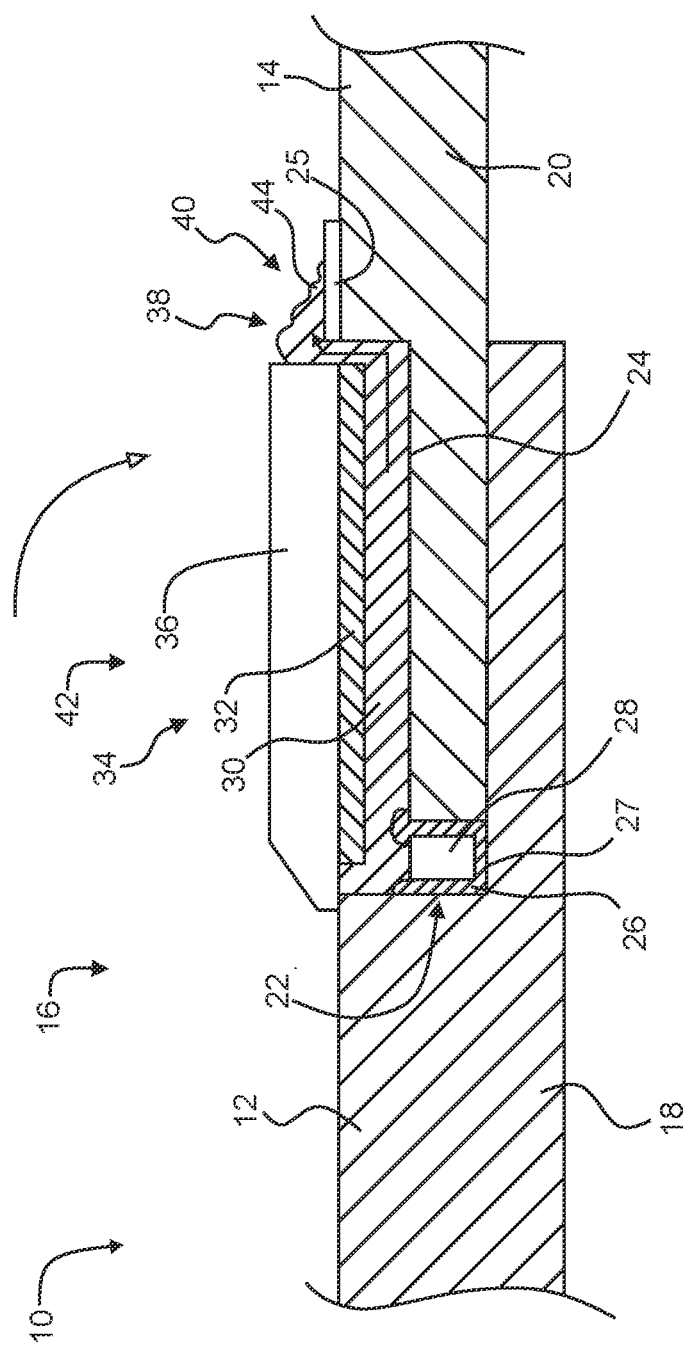
Figure 21:
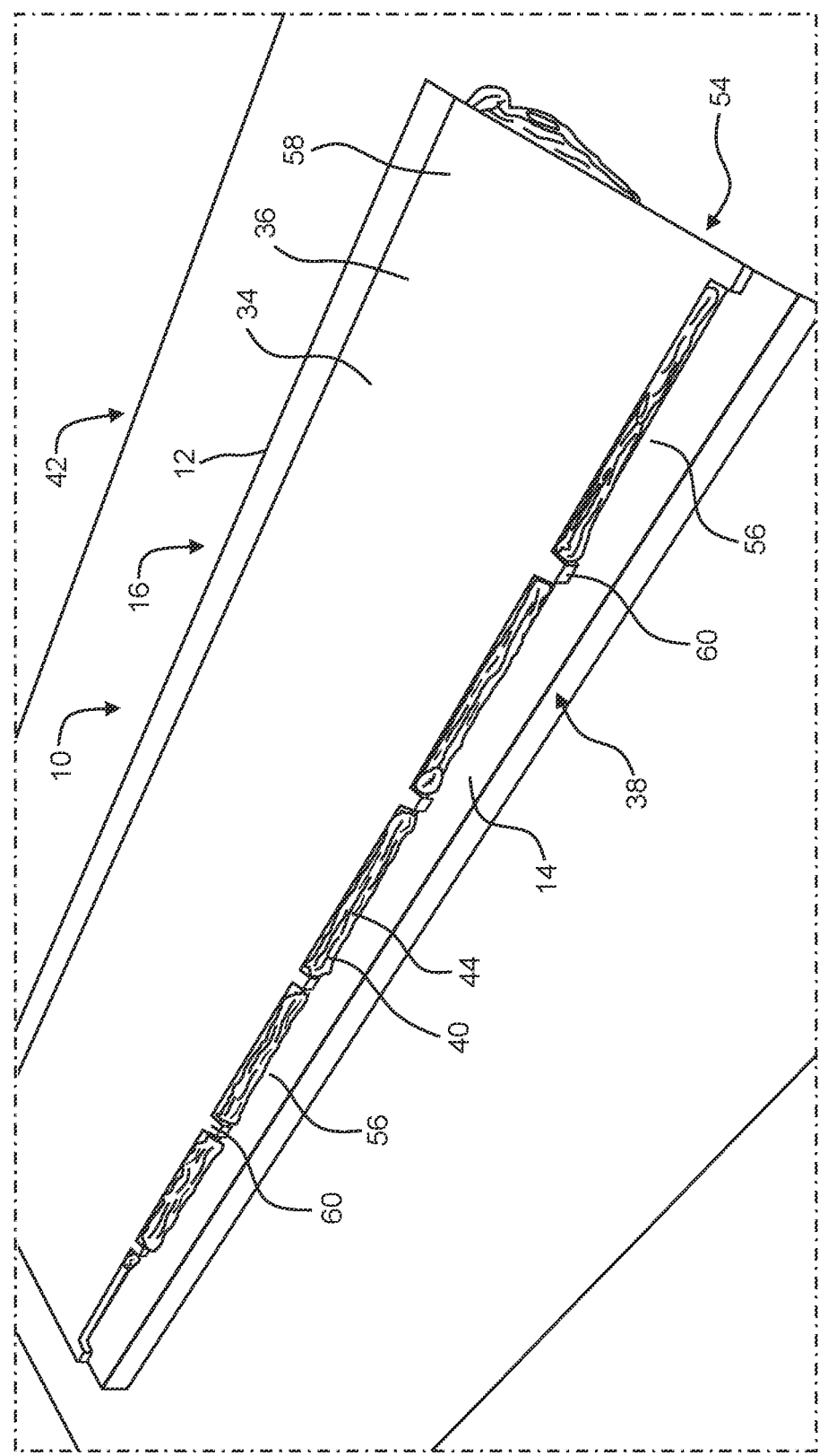

In the present case, the pressure plate arrangement 34, in particular the pressure plate body 36, defines an outlet gap 40 with the edge 38 of the joint portion 16 that faces away from the groove region 22, as illustrated in FIG. 13 and FIG. 21. The outlet gap 40 is delimited by the pressure plate body 36 on three sides and on the fourth side by the second profile element 14. Excess sealant 44 therefore exits from the outlet gap 40.

In this state, the free-flowing sealant 30 is cured, for example by thermal activation.

Figure 14:
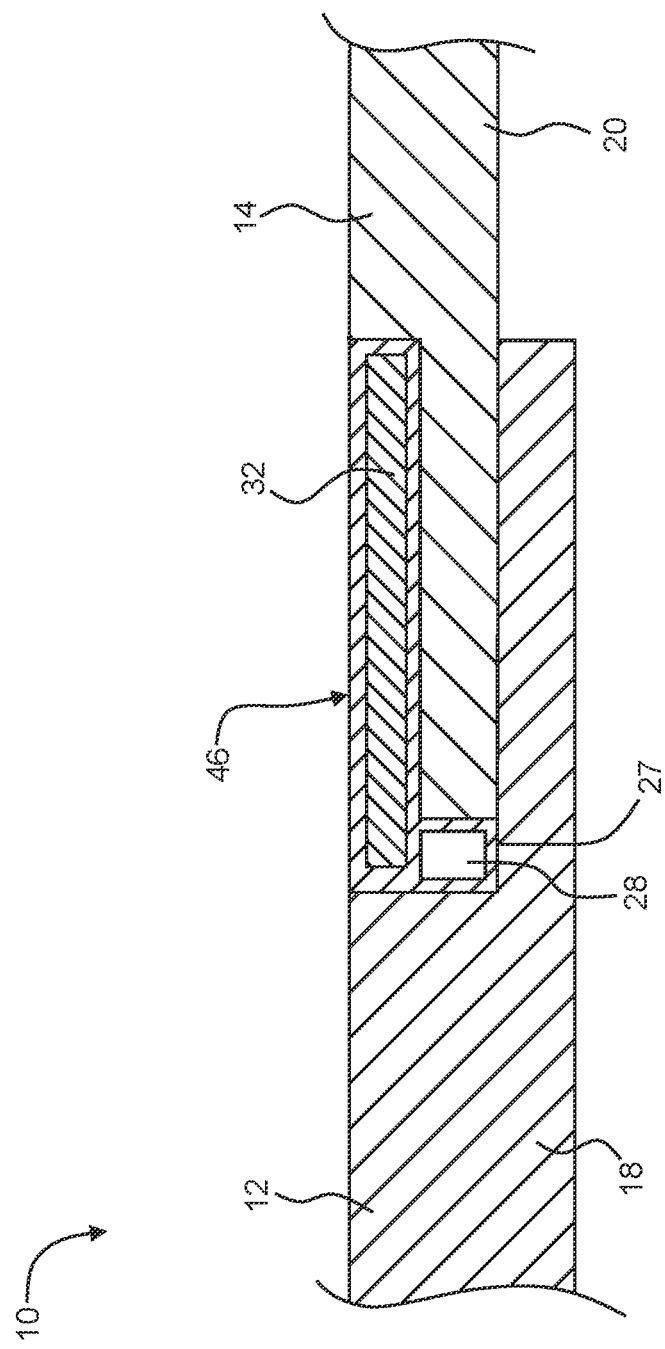

As illustrated in particular in FIG. 14, the cured excess sealant can then be removed. In addition, the processed joint portion 16 can also be ground in order to obtain the desired surface quality.

Overall, this procedure provides a transition region 46 which has considerably improved laminar flow properties.

Figure 15:
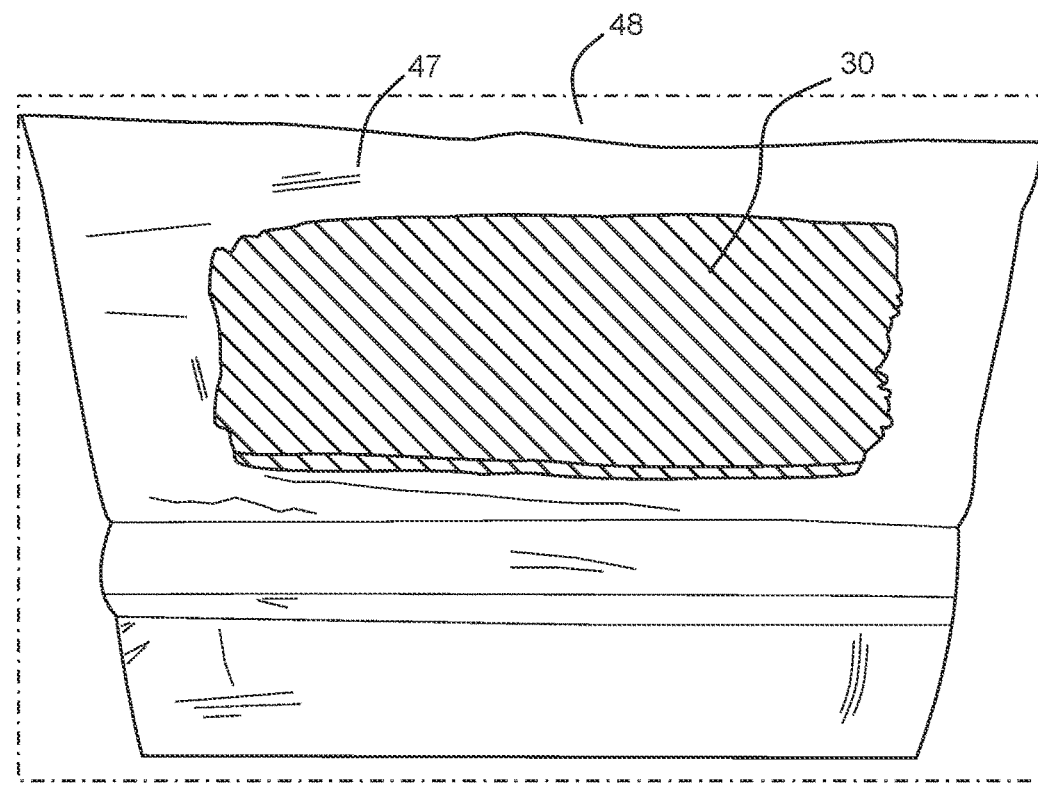
FIG. 15 to FIG. 17 show an exemplary embodiment for producing a cover strip.
Figure 16:
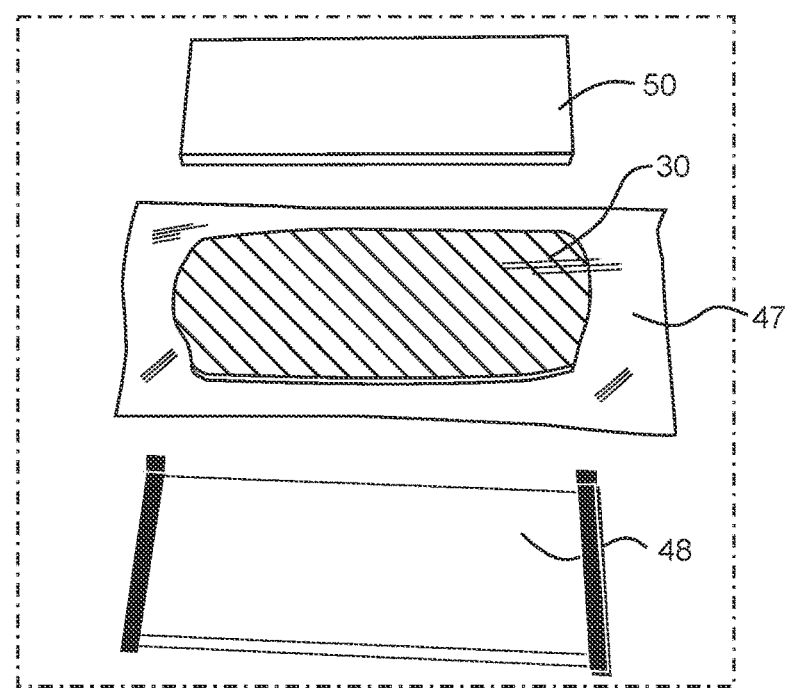
Figure 17:
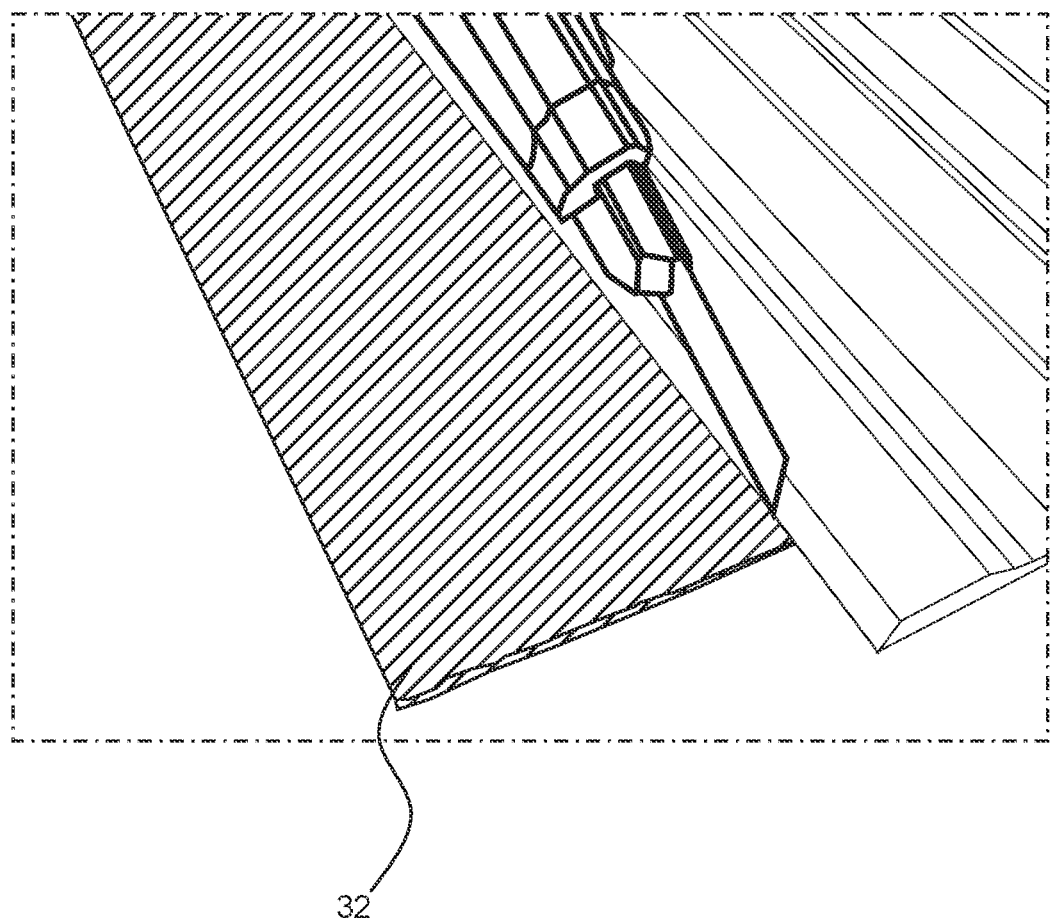
Figure 18:
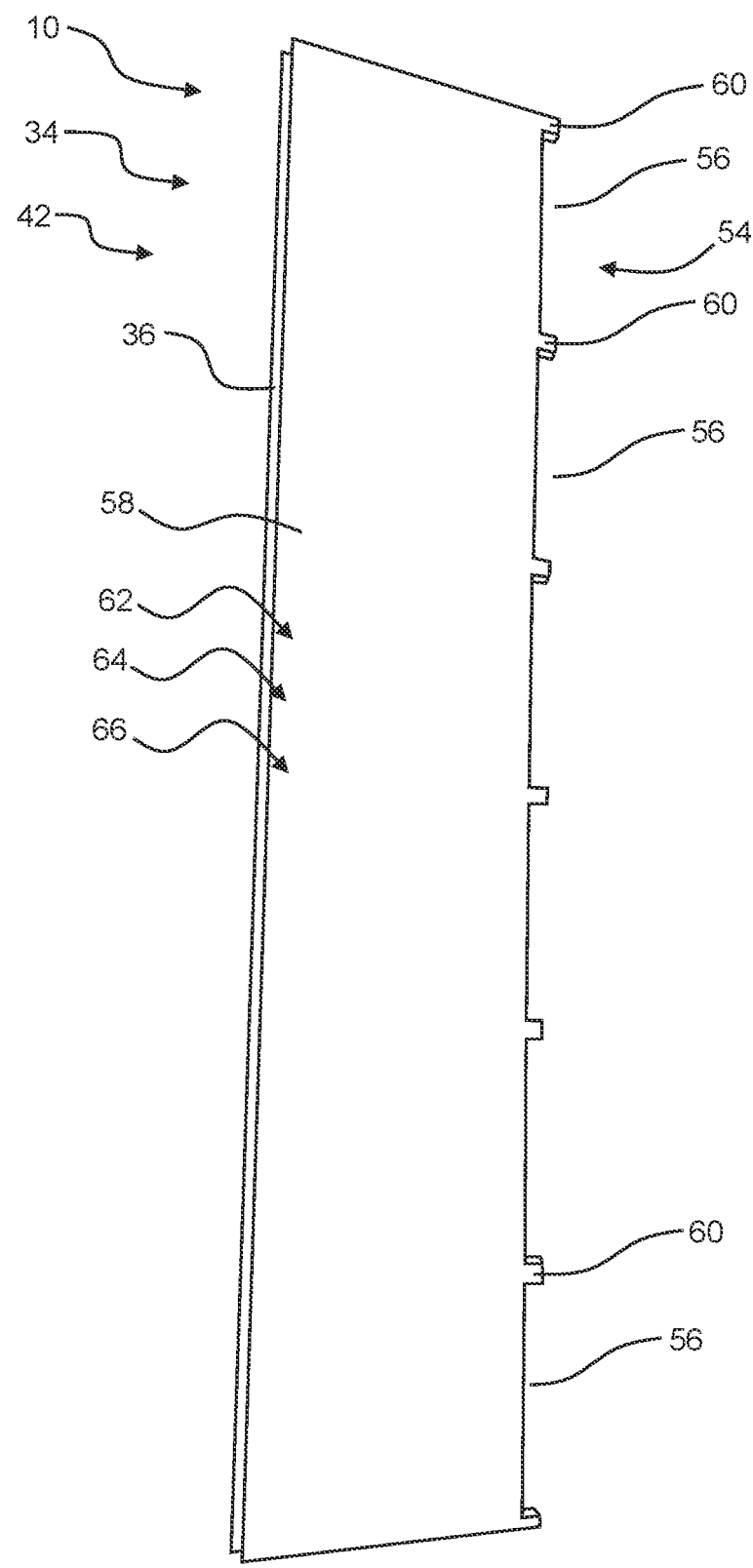
FIG. 18 to FIG. 26 show various examples of production arrangements and some variants thereof.
Figure 19:
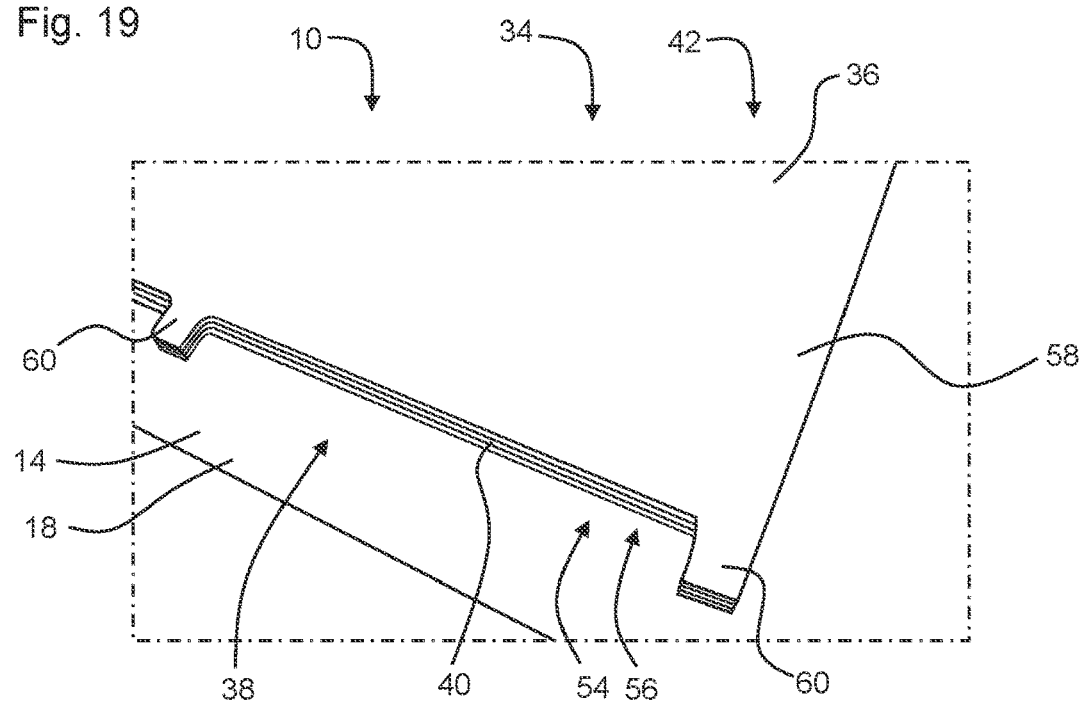
Figure 20:
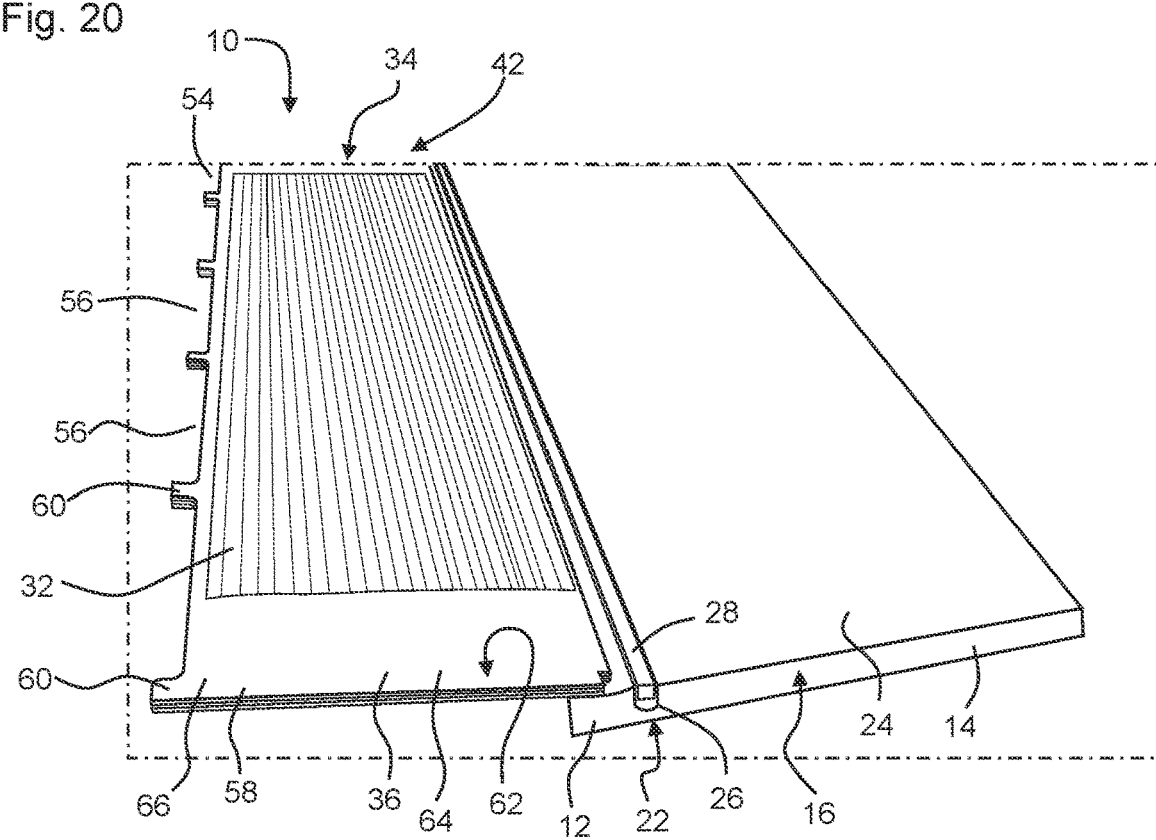

Reference will be made below to FIG. 15 to FIG. 17. To produce the cover strip 32, free-flowing sealant 30 can be applied to a base plate 48, for example a metal plate (in particular aluminum plate). The base plate 48 can have a non-stick surface, for example in the form of a PTFE film 49. A further plate 50 is applied to the base plate 48, with the result that the plate 50 covers the free-flowing sealant 30. Spacers set the desired gap size between the base plate 48 and the plate 50 in order to achieve the desired thickness of the cover strip 32. The free-flowing sealant 30 is then cured. The then at least partially cured sealant 52 is then also cut to the desired size in order to obtain the cover strip 32 as sealing strip.

Reference will be made below to FIG. 18 to FIG. 26, which show variants of the production arrangement 10.

The production arrangement 10 comprises a pressure plate arrangement 34 having a sealing strip 32 and a pressure plate body 36. The pressure plate body 36 has, on one of its longitudinal edges 54, an outlet region 56 in which, upon interaction with the profile elements 12, 14, a plurality of outlet gaps 40 are defined. The pressure plate body 36 has a pressure plate main body 58 from which there project a plurality of supporting projections 60 which are distributed along the longitudinal edge 54 and are spaced apart from one another. The pressure plate main body 58 has a pressure surface 62 by means of which the free-flowing sealant 30 can be pressed. Furthermore, a non-stick region 66 formed by a non-stick coating 64 can be provided on the pressure plate main body 58, in particular on the pressure surface 62. The non-stick region 66 has a non-stick property in relation to the sealant (partially crosslinked or cured and/or free-flowing).

Figure 23:
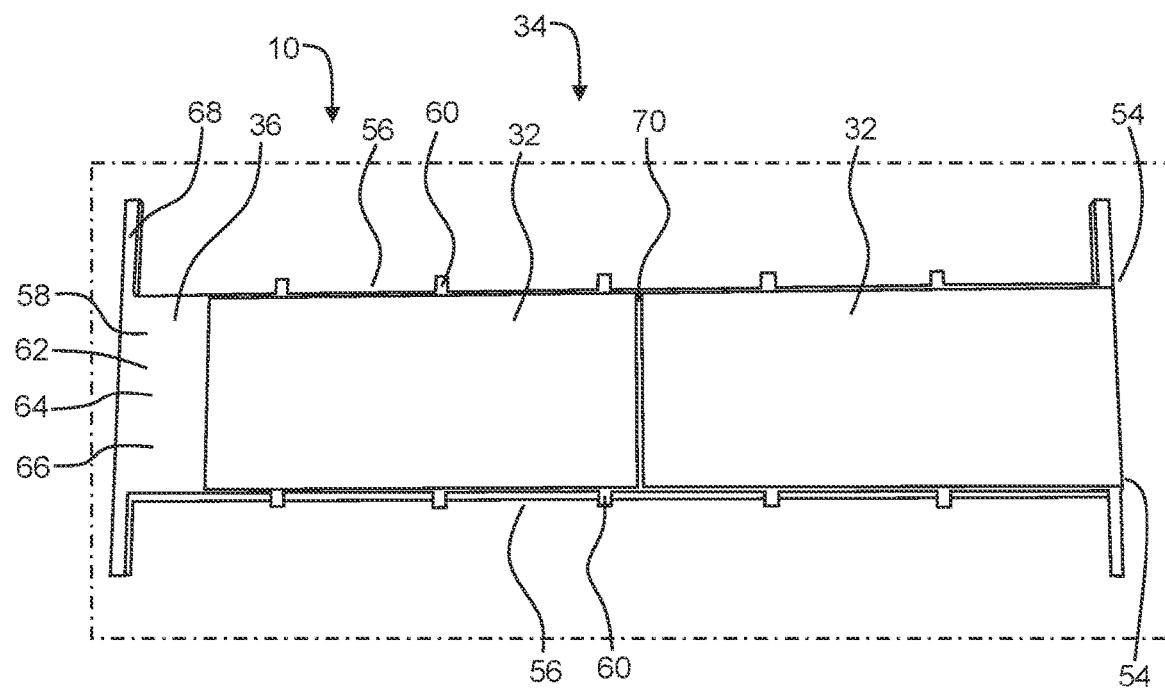
Figure 25:
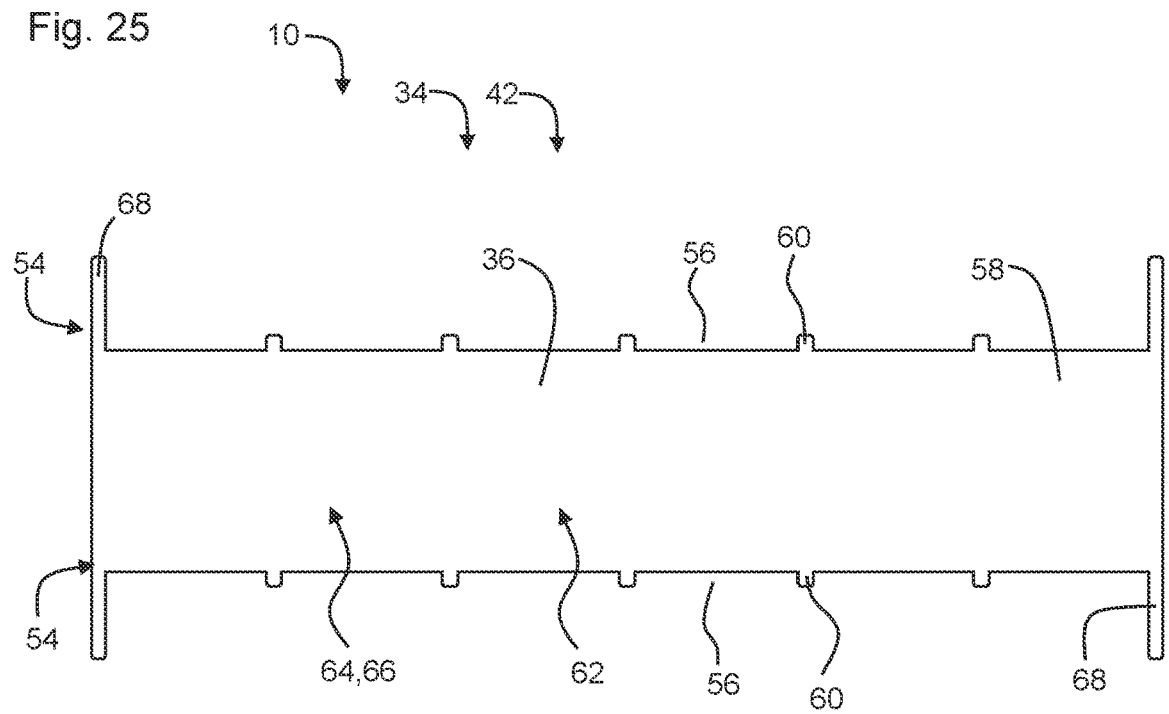
Figure 26:
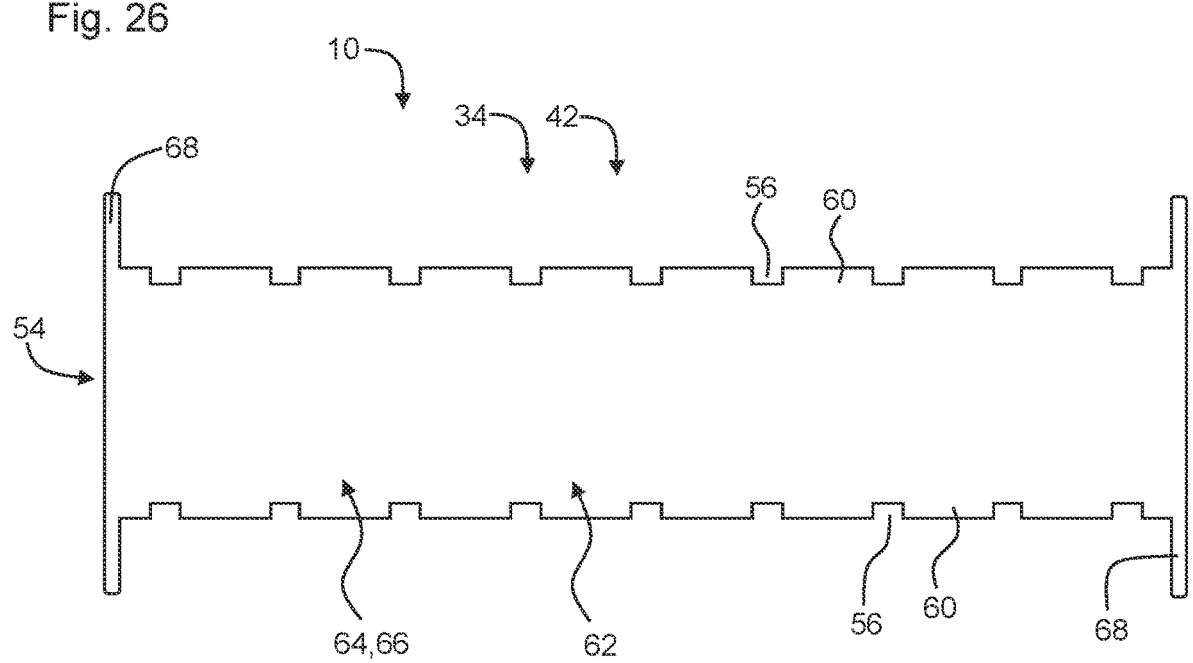

As illustrated in FIG. 23, FIG. 25 and FIG. 26, the pressure plate arrangement 34 can also have the outlet region 56 on each longitudinal edge 54. Likewise, the supporting projections 60 on each longitudinal edge 54 can project from the pressure plate main body 58. Furthermore, positioning projections 68, which are designed to be longer than the supporting projections 60, can project from the respective ends. The positioning projections 68 can also be distributed along the longitudinal edge 54. Furthermore, the positioning projections 68 can also be used as supporting projections 60.

As evident in particular in FIG. 23, there can also be provided a plurality of cover strips 32 which define a filling gap 70 between them. Pressing the free-flowing sealant 30 causes the filling gap 70 to correspondingly fill.

Furthermore, FIG. 25 and FIG. 26 illustrate the outlet regions 56 for sealants of different viscosity. High-viscosity sealants are preferably pressed by the pressure plate body 36 in FIG. 25, whereas low-viscosity sealants are preferably pressed by the pressure plate body 36 from FIG. 26. The variants differ substantially in terms of the different size of the outlet regions 56 which define the outlet gaps 40, with the result that the outlet gaps 40 for high-viscosity sealants are larger than for low-viscosity sealants.

Figure 27:
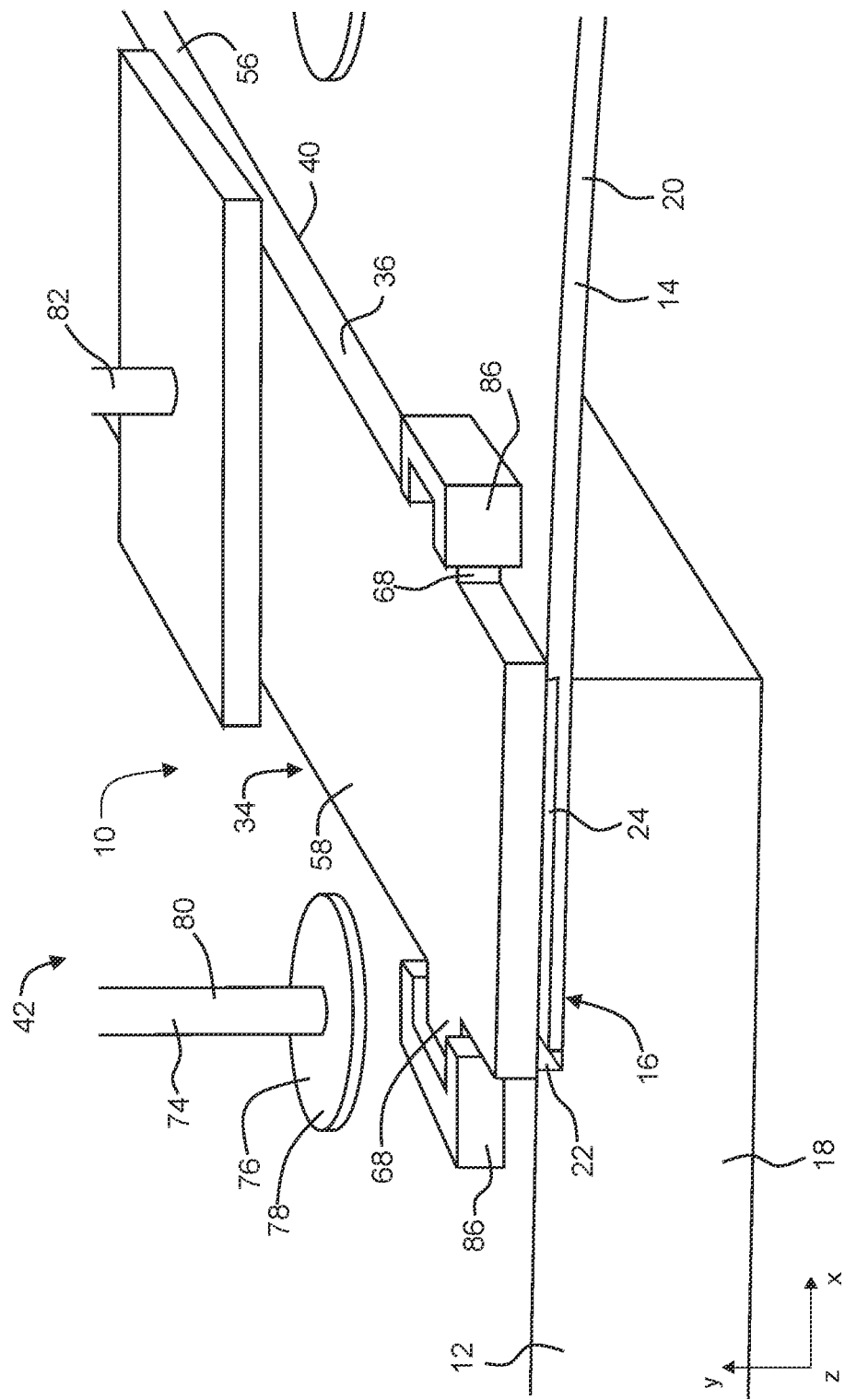
FIG. 27 to FIG. 29 show various examples of a production device.
Figure 28:
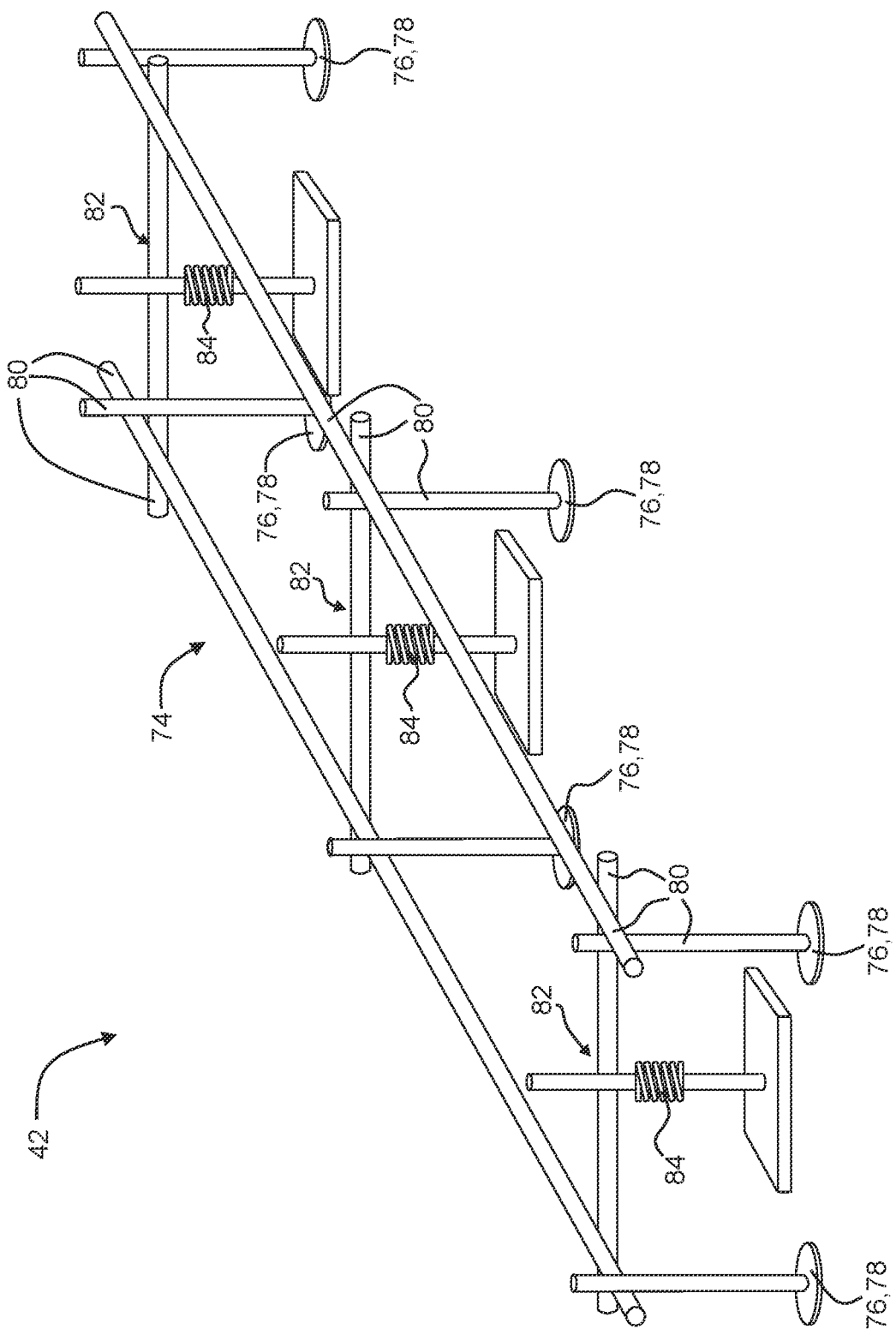
Figure 29:
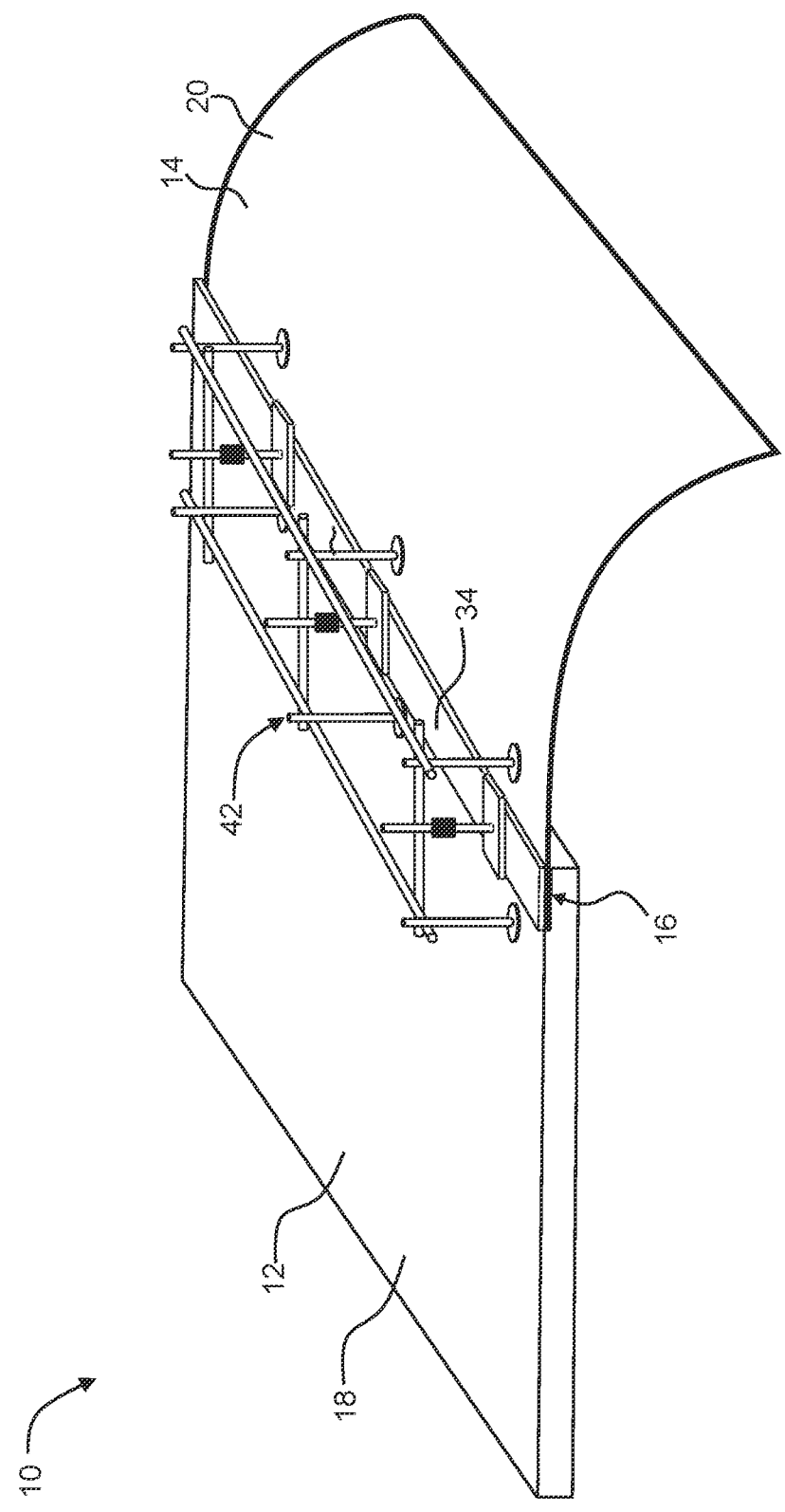

An example of the production device 42 which is used when producing the transition region 46 is explained by way of FIG. 27 to FIG. 29.

The production device 42 comprises a frame 74 which is releasably fastened to the profile elements 12, 14 by means of suction cups 76 or magnets 78, for example. The frame 74 can be formed from tubes 80 which are welded to one another or assembled by means of fittings.

The frame 74 preferably has a pressing device 82 fastened thereto, with it being possible for each of the latter to have a movable element 84 for generating a pressing-on force. The movable element 84 can comprise, for example, a spring, a spring mechanism, a pneumatic and/or hydraulic cylinder or an (electric) motor. The pressing device 82 exerts the pressing-on force on the pressure plate arrangement 34. The pressing device 82 is preferably movable in the vertical direction. In a variant, the pressing device 82 can hold the pressure plate arrangement 34 such that the pressure plate arrangement 34 is rotatable about its longitudinal axis.

Furthermore, the production device 42 can have a plurality of aligning elements 86 which can likewise be releasably fastened to the profile elements 12, 14 or are fastened to the frame 74. The aligning elements 86 are designed such that they interact with the pressure plate arrangement 34, in particular the positioning projections 68, in such a way that the pressure plate arrangement 34 is positioned along the entire length of the joint portion 16.

The pressure plate arrangement 34 can be configured such that, by virtue of the pressing-on, it is adapted to the 3D shape of the joint portion 16 or of the profile elements 12, 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Production arrangement
12 First profile element (further element)
14 Second profile element (further element)
16 Joint portion
18 Wing body
20 Wing leading edge module
22 Groove region
24 Flat region
25 Masking
26 Filling compound
27 Groove bottom
28 Insert
29 Centering element
30 Free-flowing sealant
32 Cover strip
34 Pressure plate arrangement
36 Pressure plate body
38 Edge
40 Outlet gap
42 Production device
44 Excess sealant
46 Transition region
48 Base plate
49 PTFE film
50 Plate
52 Cured sealant
54 Longitudinal edge
56 Outlet region
58 Pressure plate main body
60 Supporting projection
62 Pressure surface
64 Non-stick coating
66 Non-stick region
68 Positioning projection
70 Filling gap
74 Frame
76 Suction cup
78 Magnet
80 Tube
82 Pressing device
84 Movable element
86 Aligning element

The invention claimed is:

1. A production arrangement for producing a laminar flow surface between a plurality of profile elements, the production arrangement further comprising:
a plurality of aerodynamic profile elements forming a joint portion therebetween, the plurality of aerodynamic profile elements comprising a first aerodynamic profile element and a second aerodynamic profile element wherein a transition region is located between the first and second aerodynamic profile elements and configured to allow a laminar fluid flow flowing from the first aerodynamic profile element via the transition region to the second aerodynamic profile element,
a free-flowing or pasty sealant arranged on the joint portion, and
a pressure plate arrangement configured for pressing the free-flowing or pasty sealant within the joint portion, the pressure plate arrangement comprising a pressure plate body and at least one cover strip between pressure plate body and the free-flowing or pasty sealant, the pressure plate body having an outlet region which is configured to allow the free-flowing or pasty sealant to exit during pressing thereof and a plurality of supporting projections located on a common side of the transition region, the plurality of supporting projections support the pressure plate body against one of the first or second aerodynamic profile elements, wherein the supporting projections are arranged spaced apart from one another in a longitudinal direction of the pressure plate body extending parallel to a length of the transition region and delimit outlet gaps of the outlet region between the adjacent supporting projections of the plurality of supporting projections.

2. The production arrangement according to claim 1, wherein the outlet region is arranged on a longitudinal edge region of the pressure plate body extending parallel to the longitudinal direction of the pressure plate body.

3. The production arrangement according to claim 2, wherein a second outlet region is arranged on a second longitudinal edge region of the pressure plate body extending parallel to the longitudinal direction of the pressure plate body and spaced apart from the longitudinal edge region in a transverse direction of the pressure plate body.

4. The production arrangement according to claim 1, wherein the pressure plate body, has at least one of
a pressure surface for pressing free-flowing or pasty sealant; or
a non-stick region comprising a pressure surface, with non-stick properties in relation to the sealant.

5. The production arrangement according to claim 4, wherein the at least one cover strip is releasably fastened to the pressure plate body.

6. The production arrangement according to claim 5, wherein the at least one cover strip is releasably fastened to the pressure surface.

7. The production arrangement according to claim 1, wherein the pressure plate body has a plurality of positioning projections for positioning the pressure plate body relative to a further element, wherein the positioning projections are arranged spaced apart from one another in the longitudinal direction of the pressure plate body.

8. The production arrangement according to claim 7, wherein, the positioning projections are arranged with a larger spacing than a spacing of the supporting projections.

9. The production arrangement according to claim 8, wherein, the positioning projections are arranged at an integral multiple of the spacing of the supporting projections, and delimit outlet gaps of the outlet region between them.

10. The production arrangement according to claim 1, wherein a further cover strip is provided which is spaced apart from the at least one cover strip in a longitudinal direction and delimits a filling gap with the at least one cover strip.

11. The production arrangement according to claim 10, wherein a plurality of aligning elements which can be releasably fastened to the profile elements and which are configured to interact with the pressure plate arrangement such that the pressure plate arrangement is positionable along a joint portion formed by the profile elements so as to follow the joint portion.

12. The production arrangement according to claim 1,
wherein the pressure plate body comprises a longitudinal edge region from which the supporting projections project,
wherein, as seen in plan view, the pressure plate body, together with the supporting projections, delimits the outlet gaps only on three sides,
wherein, as seen in plan view, the fourth side of the outlet gap is delimited by a further element.

13. The production arrangement according to claim 1, wherein a crosslinking device which is configured for at least one of partially crosslinking or curing free-flowing or pasty sealant and which is arranged on the pressure plate body, wherein the crosslinking device has a heating device for heating free-flowing or pasty sealant in order to partially crosslink or cure the free-flowing or pasty sealant.

14. The production arrangement according to claim 1, wherein a crosslinking device which is configured for at least one of partially crosslinking or curing free-flowing or pasty sealant and which is arranged on the pressure plate body, wherein the crosslinking device has an irradiating device for irradiating free-flowing or pasty sealant in order to partially crosslink or cure the free-flowing or pasty sealant.

15. The production arrangement according to claim 1, wherein the first and second profile elements and each of the plurality of supporting projections are located along a lengthwise edge of the pressure plate body.

16. A method for producing the at least one cover strip for use in the production arrangement according to claim 1, comprising the following steps:
a) applying free-flowing and/or pasty sealant, which is also used in one of the devices, to a base plate;
b) pressing the free-flowing or pasty sealant to a defined thickness by means of a further plate to obtain a plate-shaped free-flowing or pasty sealant;
c) partially crosslinking or curing the plate-shaped free-flowing or pasty sealant to form a plate-shaped partially crosslinked or cured sealant; and
d) cutting the plate-shaped partially crosslinked or cured sealant to obtain the at least one cover strip.

17. A production method for producing a transition region between a plurality of aerodynamic profile elements, wherein the transition region is configured to allow a laminar fluid flow flowing from a first of the aerodynamic profile elements via the transition region to a second of the aerodynamic profile elements, comprising the following steps:
a) arranging the aerodynamic profile elements such that the aerodynamic profile elements define a joint portion;
b) applying free-flowing or pasty sealant to the joint portion, and, to form the transition region, pressing the free-flowing or pasty sealant by means of a pressure plate arrangement delimiting an outlet gap for free-flowing or pasty sealant, wherein a quantity of the free-flowing or pasty sealant is dimensioned such that, during pressing, some of the free-flowing sealant exits from the outlet gap as excess sealant;
c) partially crosslinking or curing the free-flowing and/or pasty sealant; and
d) removing the excess sealant,
wherein a pressure plate body has a plurality of supporting projections located on a common side of the transition region, the plurality of supporting projections support the pressure plate body against one of the plurality of aerodynamic profile elements, wherein the plurality of supporting projections are arranged spaced apart from one another in a longitudinal direction of the pressure plate body extending parallel to a length of the transition region and delimit the outlet gap between adjacent supporting projections of the plurality of supporting projections.

* * * * *